(12) United States Patent
Knox et al.

(10) Patent No.: US 7,554,737 B2
(45) Date of Patent: Jun. 30, 2009

(54) ILLUMINATION DEVICE AND METHOD USING ADAPTABLE SOURCE AND OUTPUT FORMAT

(75) Inventors: Richard M. Knox, Lago Vista, TX (US); Kevin Hathaway, Saratoga, CA (US); David Kappel, San Diego, CA (US); Robert E. Fischer, Westlake Village, CA (US); Biljana Tadic-Galeb, Thousand Oaks, CA (US)

(73) Assignee: Riake Corporation, Lago Vista, TX (US)

( * ) Notice: Subject to any disclaimer, the term of this patent is extended or adjusted under 35 U.S.C. 154(b) by 493 days.

(21) Appl. No.: 11/073,893

(22) Filed: Mar. 7, 2005

(65) Prior Publication Data

US 2006/0291020 A1    Dec. 28, 2006

(51) Int. Cl.
   *G02B 5/02* (2006.01)
(52) U.S. Cl. .................... 359/599; 359/15; 362/355; 362/311
(58) Field of Classification Search ........... None
   See application file for complete search history.

(56) References Cited

U.S. PATENT DOCUMENTS

| 5,644,369 | A | * | 7/1997 | Jachimowicz et al. | ......... 349/10 |
| 5,757,544 | A | * | 5/1998 | Tabata et al. | ............... 359/434 |
| 5,808,759 | A | * | 9/1998 | Okamori et al. | ............... 359/15 |
| 5,831,698 | A | * | 11/1998 | Depp et al. | .................... 349/64 |
| 6,191,876 | B1 | * | 2/2001 | Popovich | ..................... 359/15 |
| 6,191,891 | B1 | * | 2/2001 | Pellicori | ..................... 359/599 |
| 6,473,209 | B1 | * | 10/2002 | Popovich | ..................... 359/22 |
| 6,646,636 | B1 | * | 11/2003 | Popovich et al. | ............ 345/204 |

* cited by examiner

*Primary Examiner*—Arnel C Lavarias
(74) *Attorney, Agent, or Firm*—Law Offices of Mark L. Berrier

(57) ABSTRACT

Systems and methods for providing illumination suitable for imaging devices such as laser projection systems, wherein the illumination pattern is adjustable by modifying one or more characteristics of a controlled angle diffuser. In one embodiment, a highly collimated (e.g., laser light) beam is passed through a holographic diffuser to create a well defined cone angle for the light emanating from each point on the diffuser. This light is focused into an illumination image that is controlled by the prescription of the diffuser. In one embodiment, the diffuser can be positioned to alternately place different regions having different prescriptions in the optical path corresponding to the illumination image. In one embodiment, the diffuser can be continually moved to eliminate speckling and "worminess" in the illumination image.

5 Claims, 14 Drawing Sheets

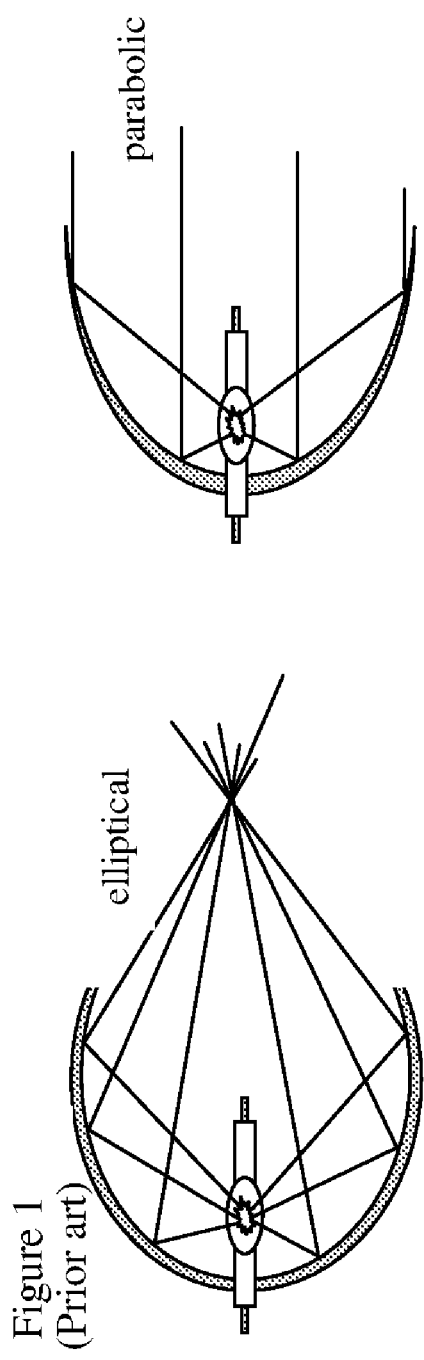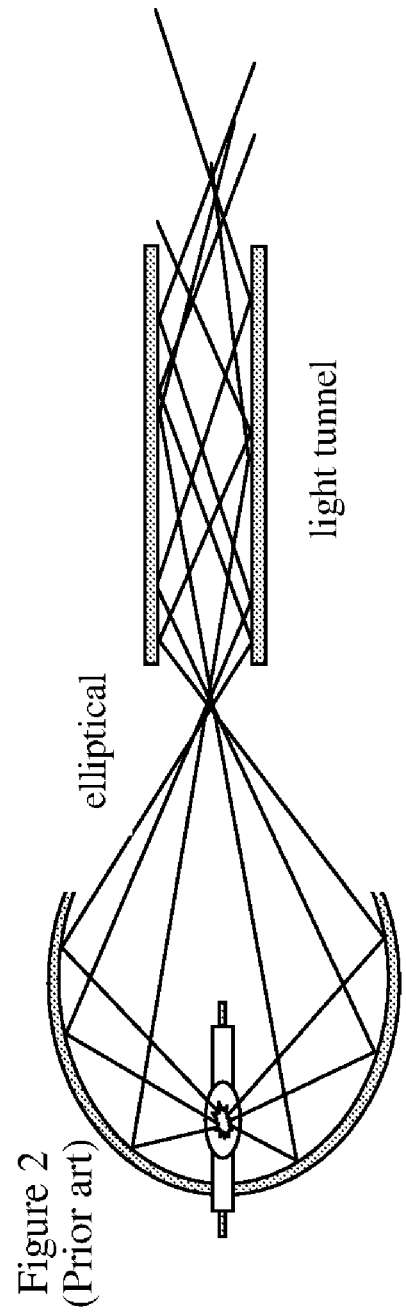

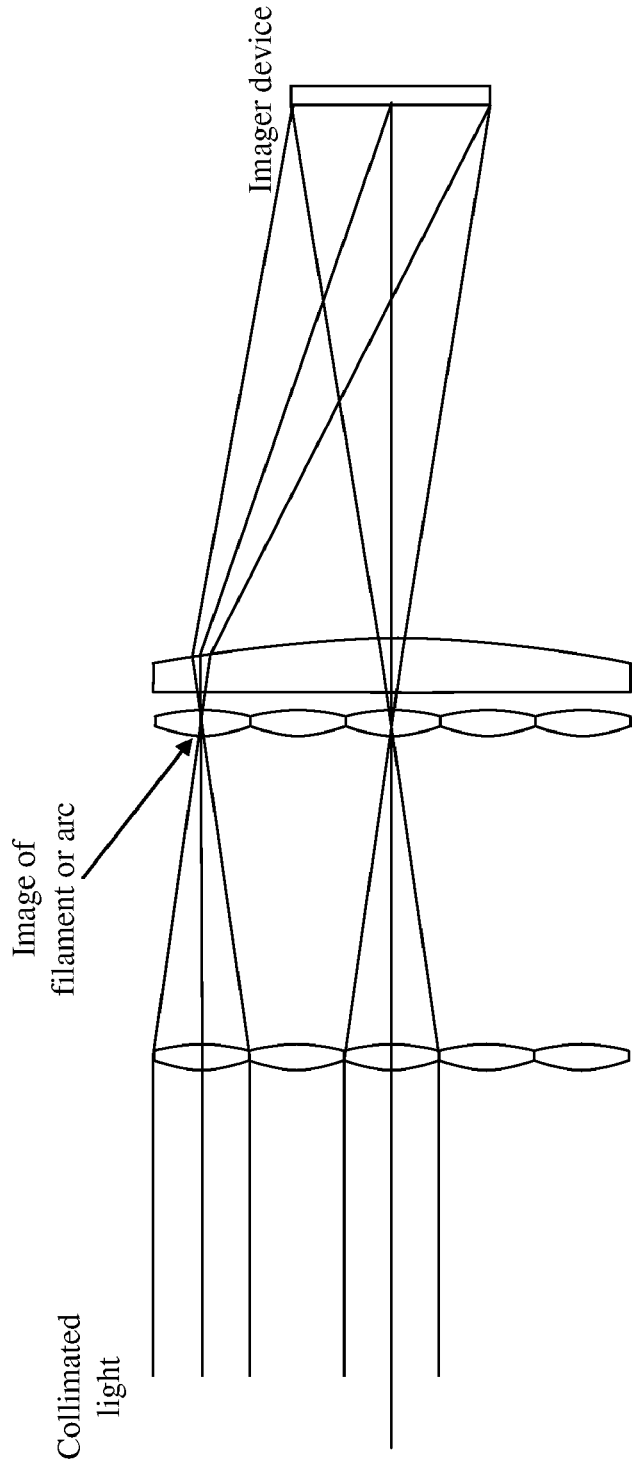
Figure 3  Lenslet array prior art with limited ray trace  (Prior art)
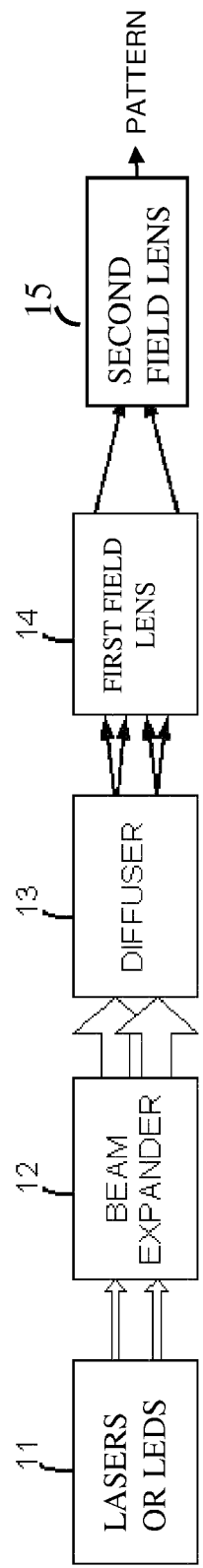
Figure 4  Block Diagram of one embodiment

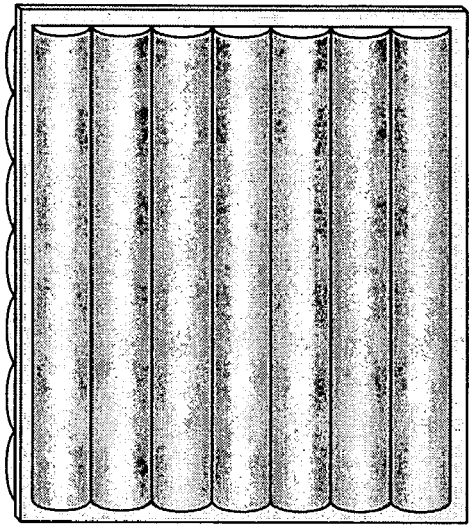
Figure 5b  crossed cylindrical lenticular single element
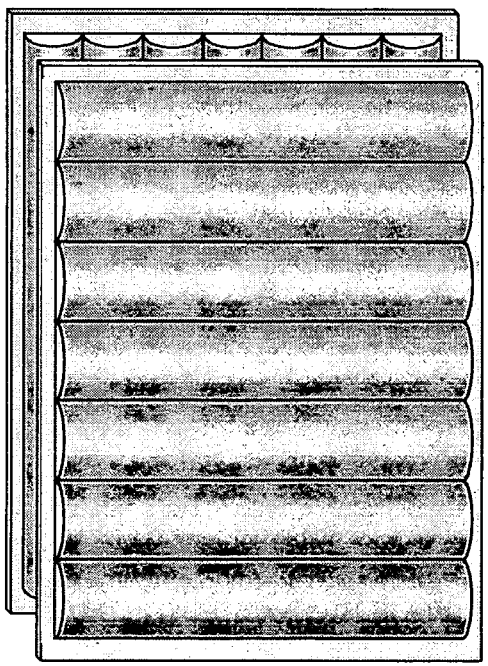
Figure 5a  crossed cylindrical lenticular
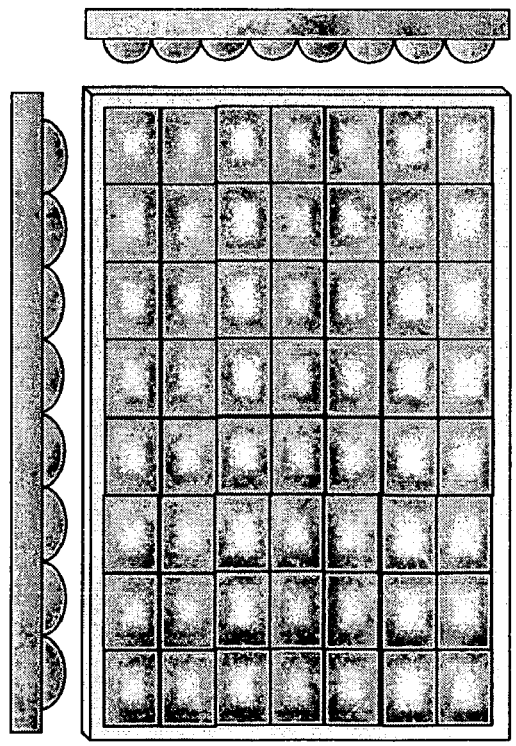
Figure 5c  crossed cylindrical lenslet integrated

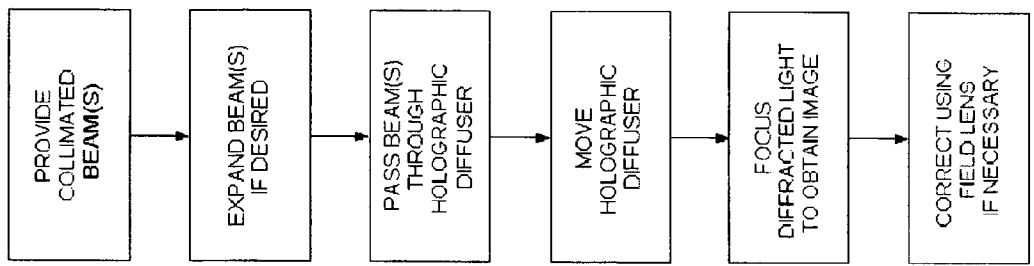
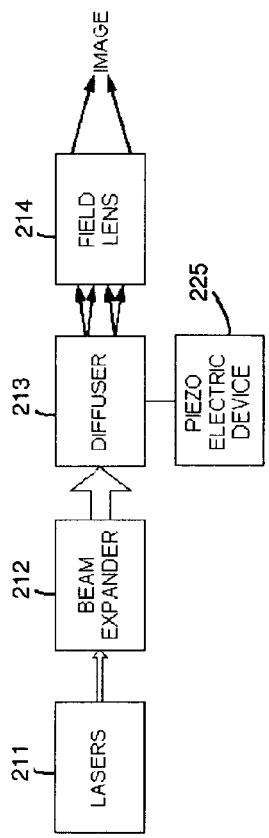
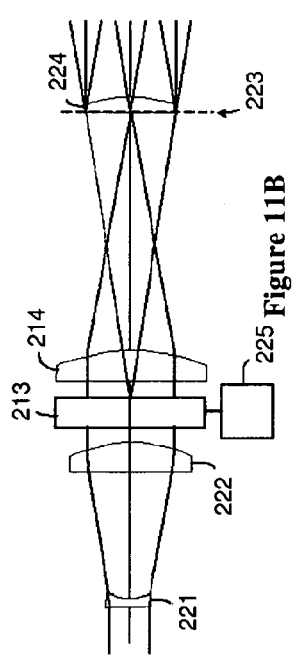
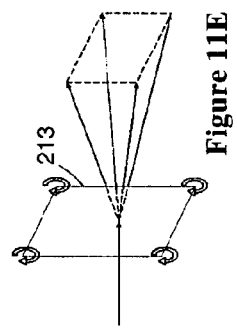
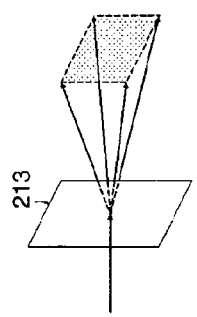
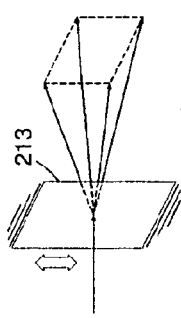

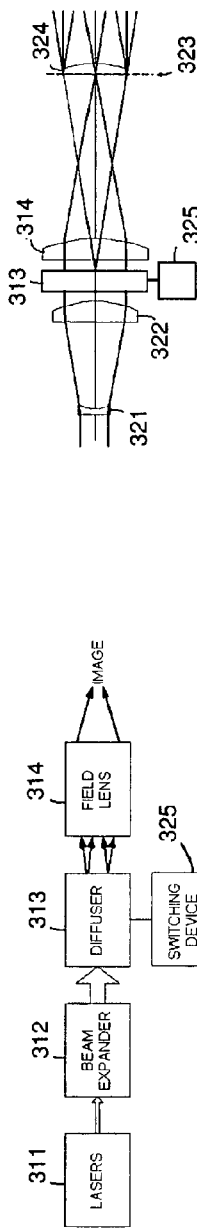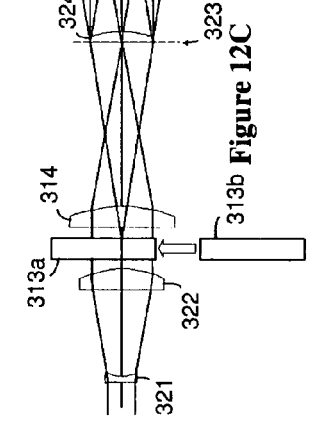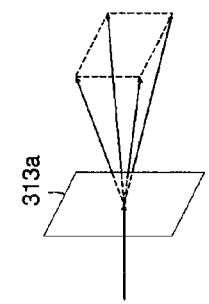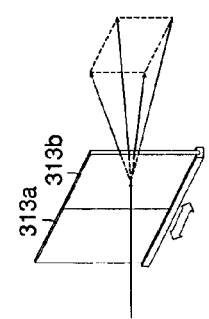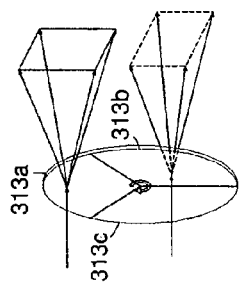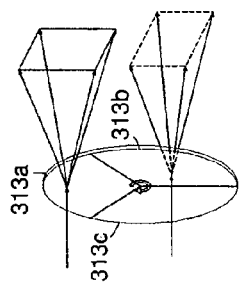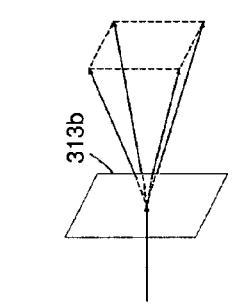

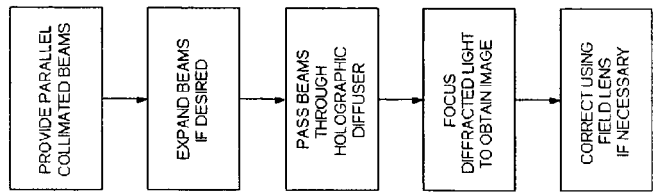
Figure 13G
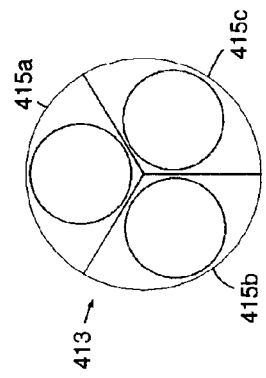
Figure 13E
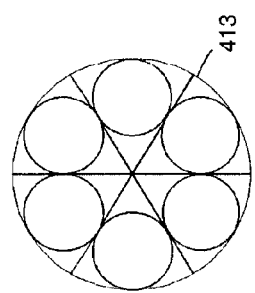
Figure 13F
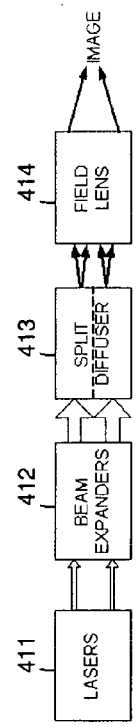
Figure 13A
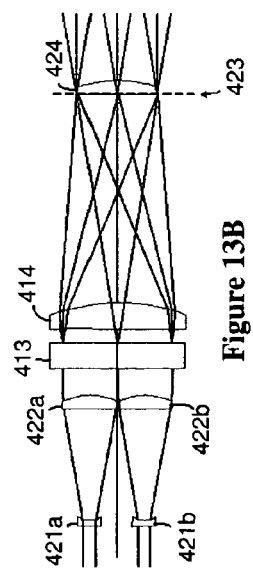
Figure 13B
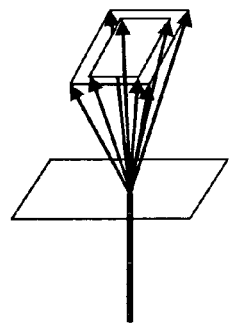
Figure 13C
Figure 13D

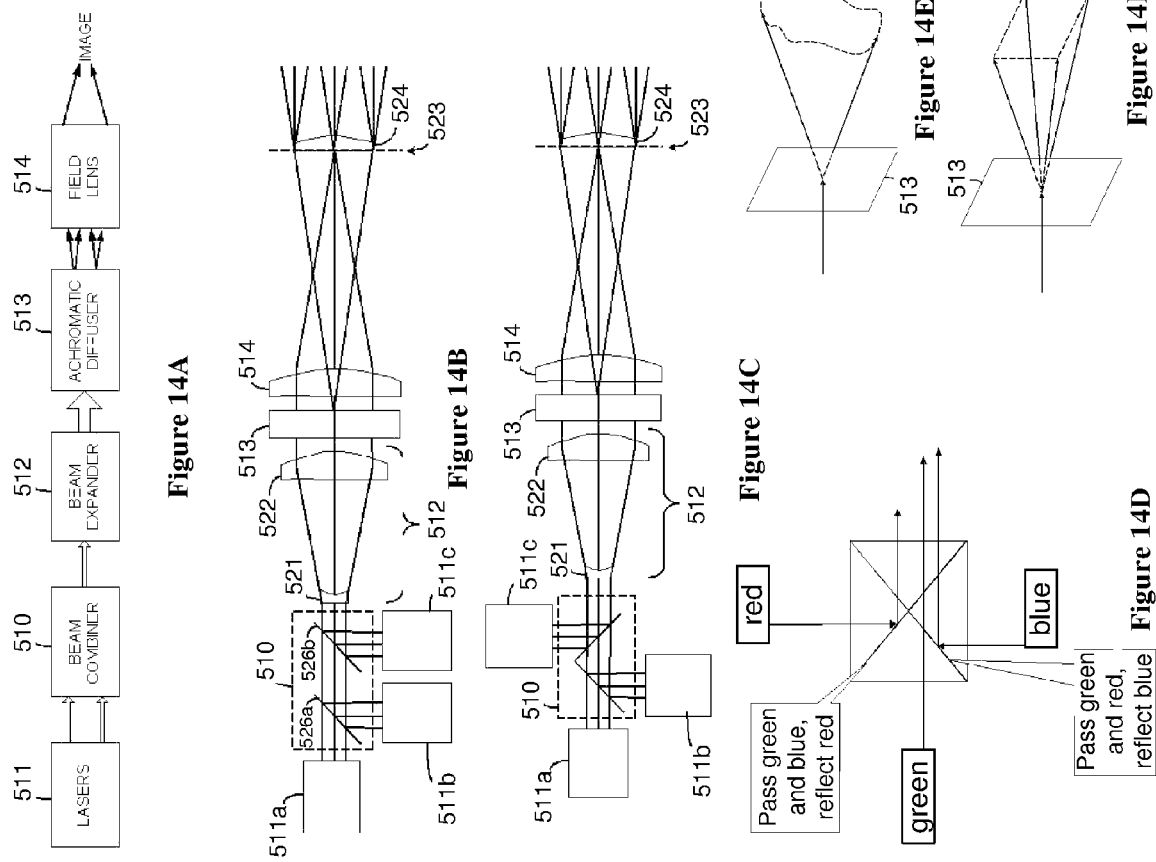

ILLUMINATION DEVICE AND METHOD USING ADAPTABLE SOURCE AND OUTPUT FORMAT

RELATED APPLICATIONS

This application claims the benefit of and hereby incorporates by reference U.S. patent application Ser. No. 10/453,960, filed on Jun. 4, 2003, entitled "Illumination Device and Method for Laser Projector", which claims priority to U.S. patent application Ser. No. 09/682,178, filed on Jul. 31, 2001, entitled "Illumination Device and Method for Laser Projector", which claims the benefit of the following U.S. provisional applications under 35 U.S.C. 119(e) which are all hereby incorporated by reference as if fully set forth herein: Ser. No. 60/257,061, filed on Dec. 20, 2000 entitled "Method and Apparatus for Combining Parallel Collimated Lightbeams", Ser. No. 60/257,047, filed on Dec. 20, 2000 entitled "Method and Apparatus for Combining Parallel Collimated Lightbeams", Ser. No. 60/257,062 filed on Dec. 20, 2000 entitled "Method and Apparatus for Eliminating Zero-Order Light Leak in an Illumination Device", Ser. No. 60/257,063, filed on Dec. 20, 2000 entitled "Method and Apparatus for Providing an Illumination Source Using a Segmented Diffuser"; Ser. No. 60/257,045, filed on Dec. 20, 2000 entitled "Method and Apparatus for Combining Polychromatic Light Beams Using an Achromatic Diffuser, Ser. No. 60/257,046, filed on Dec. 20, 2000 entitled "Illumination Device Using Multiple Laser Light Sources and Having a Zero-Order Light Leak Correction, Ser. No. 60/284,455, filed on Apr. 18, 2001 entitled "Method and Apparatus for Providing Selectable Illumination Sources", Ser. No. 60/282,738, filed on Apr. 10, 2001 entitled "Polychromatic Display Device Using Monochromatic Diffusers, a Beamsplitter and a Combiner in an Optical Processor Space", Ser. No. 60/282,736, filed on Apr. 10, 2001 entitled "Method and Apparatus for Combining Multiple Monochromatic Images Using an Optical Processor Space", Ser. No. 60/282,735, filed on Apr. 10, 2001 entitled "Monochromatic Display Device Using a Monochromatic Diffuser and a Beamsplitter and a Combiner in an Optical Processor Space", Ser. No. 60/282,737, filed on Apr. 10, 2001 entitled "Polychromatic Display Device Using a Chromatic Combiner, and Achromatic Diffuser and a Beamsplitter and a Combiner in an Optical Processor Space", Ser. No. 60/282,734, filed Apr. 10, 2001 entitled "Polychromatic Display Using Monochromatic Diffusers, a Beamsplitter and a Combiner in an Optical Processor Space".

BACKGROUND

1. Field of the Invention

The invention relates to systems and methods for providing illumination in systems such as projection displays, and more particularly an improved method of homogenizing and formatting the light from a light source to produce higher uniformity and efficiency in the projected image.

2. Related Art

Illumination systems used for image projectors are designed to generate a spatially uniform plane which can be used to illuminate an imaging device, film or other media. The reflected or transmitted light from the imaging device is then projected onto a screen for viewing. The brightness and spatial brightness uniformity should be within certain limits for each particular application to be considered acceptable to the viewers.

Image projectors including film movie projectors, slide projectors, electronic liquid crystal and micro-electro-mechanical (mem) projectors, microfilm and overhead projectors all require a high degree of spatial light uniformity in the image to produce a pleasing image. This has always been a challenge for projection system designs due to the fact that the light sources available for these systems all have very disorganized light output and therefore require complex optical systems to organize the light. Additionally, high degrees of magnification in short distances (which often occur in these optical systems) cause a problem which is well known in the optical field —the cosine4 roll off of power in the image as you move radially away from the center of the image. This effect is most predominant at the corners of the image. Another problem is that light sources tend to produce round or elliptical Gaussian beam profiles, while most images are rectangular in format. Typically, the light beam is spatially truncated (i.e., the portions of the beam which fall outside a rectangular profile that corresponds to the image are blocked). This leads to another problem, which is maximizing the brightness of the illumination —when the light is truncated to change its geometry, the truncated light is obviously wasted.

Many optical methods have been used in the prior art to try to minimize the variations in uniformity which are due to the particular characteristics of the available light sources as well as to maximize the brightness of the illumination. The optical method used depends somewhat on the light source used. Many different types of light sources are in common use today. Some types are electric filament, and arc lamps including metal halide arc, low and high pressure mercury arc, xenon arc, carbon arc, as well as solid state Light Emitting Diode (LED) sources, and solid state, pumped, and gas Lasers. Not all of these light sources, however, are suitable for displays using prior art technologies.

Two of the most common types of light sources in use in commercial applications are metal halide arc lamps and high pressure mercury arc lamps. These arc lamps are usually configured in an optical illumination system which employs an elliptical or parabolic reflector to gather and direct the light to a focal point or collimated beam respectively, as shown in FIG. 1. Both of these types of systems produce highly non-uniform beams. Some systems use reflective tunnels or light pipes through which the source light is channeled in order to create a scrambled, hence more spatially uniform bundle of light rays as shown in FIG. 2.

Lenslet arrays are also sometimes used to increase the uniformity of the light. Some versions of these lenslets are described in U.S. Pat. No. 5,098,184 and U.S. Pat. No. 5,418,583. The lenslet arrays function essentially in the following manner. Two lenslet arrays are separated by a distance equal to the focal length of the individual elements. The elements of the first array form an image of the source in the aperture of the elements of the second array. In the case of a laser, the source image is a diffraction pattern. The elements of the second array then form an image of the aperture of the elements of the first array on the illumination plane. The aperture is chosen to match the aspect ratio of the device (film gate, or LCD) to be illuminated. In this manner a beam with non-uniform irradiance may be sampled by arrays composed of many elements and converted to a uniform beam with a different geometry (generally rectangular).

The lenslet array optical system which is used in an illumination system has design characteristics that must be adjusted to ensure that the illumination and imaging systems are compatible. If they are not, then light is wasted. For example, the geometry of the illumination should be the same as the geometry of the imager. The numerical aperture of the illumination system should also be compatible with the imaging system. The ratio of the footprint of light incident on the first array to the distance to the illumination plane determines the numerical aperture of the illumination light. Thus the focal length of the array elements and the field lens focal lengths are adjusted to ensure that the illumination numerical aperture matches the imaging numerical aperture.

At first blush, laser and light emitting diode (LEDs) light appear to have enormous potential for being the illumination sources in projection display systems. In the case of Lasers, the light is well behaved and organized (ie: it is collimated), it is chromatically pure, and with a minimum of three wavelengths (Red, Green, and Blue) a high color space or gamut can be created, and high power low cost lasers are becoming available. There are, however, several problems with laser-based illumination systems. Some solutions to these problems are described in prior art U.S. Pat. No. 6,606,173 B2, of which a specific embodiment is shown in FIG. 9 for reference. The embodiments of the present invention provide improvements to the basic system described in this patent.

First, the coherency and narrow bandwidth of laser light leads to speckle, which is a fine-grained non-uniformity. The speckling effect is increased with the use of so-called holographic diffusers. The net effect is often a high frequency mottling effect sometimes called "worminess." Another problem is that the laser light is collimated and, as such, it is difficult to create a cone or numerical aperture which will allow an image to be projected onto a screen, as with a projector. Yet another problem is that the laser light typically has a Gaussian intensity profile and it may have a wide range of diameters, depending upon the particular laser source which is used. This can, and often does, lead to a non-uniform light distribution on the final screen or projected image surface.

Another problem is that currently available lasers and LEDs typically do not have enough power to provide sufficient illumination in some display devices. Further, using prior art methods, it is difficult to combine the beams of multiple lasers or LEDs to obtain sufficient illumination for this purpose.

Another problem with the use of laser light as a display illumination device is that the beam generated by a laser may be astigmatic in its divergence. In other words, the divergence in the beam's cross section may be greater in one axis than another. This causes additional processing problems compared to a circularly symmetric diffraction limited beam.

Yet another problem with the use of laser light in a display illumination device is that, if laser light is diffracted in an optical system, a certain amount of light passes through the diffracting device without being diffracted. This effect is referred to as zero-order light leak. Zero-order light leak may prevent the resulting diffraction pattern from conforming to a well-defined, desired function.

Yet another problem with the use of laser or LED light in a display illumination device is that optical processors for formatting the illumination image from the laser source are configured to provide a single fixed illumination aspect ratio format. In many cases the particular display image may be originally formatted in 4:3, 16:9, "letterbox," or other format. To obtain a different aspect ratio format for use in the display, the illumination source is typically masked, so a portion of the light is lost and significant system efficiency is lost. In order to utilize all of the light generated by the laser source, it may therefore be necessary to use an entirely different optical processor.

Another problem with using laser or LED light sources for illumination is that they are monochromatic. Since it is desirable to have a source of white light, it may be necessary to combine light beams from these devices of several different wavelengths (e.g., red, green and blue) in order to produce a multi-color or full-color image, This may be difficult because many optical systems and components are wavelength-dependent and may therefore require color correction to provide uniform illumination.

Another problem with the use of laser light in display systems is that a large physical volume is normally required. The space requirements of these systems results in part from the separate processing of the laser illumination light in a first optical system and the subsequent processing of the image information in a second optical system so that it can be displayed for viewing.

SUMMARY OF THE INVENTION

One or more of the problems outlined above may be solved by the various embodiments of the invention and generally have to do with improvements and variants in relative motion, position, patterning, and prescription of the holographic diffuser shown in FIG. 9. The present techniques may be applied to many types of illumination sources such as arc lamps and LED's in addition to lasers.

Embodiments of the invention include a system and method for converting a laser or LED having a non-uniform optical output profile into a source of illumination which has uniform power density. The generated illumination image may be used for a variety of purposes. For example, the image may be a uniformly intense rectangle suitable for use in a display device, or it may be a round dot suitable for transmitting the light into an optical fiber. The present embodiments can be used to conserve the power generated by the laser or LED source and direct substantially all of the power into the desired illumination region. Laser speckle artifacts can also be reduced or eliminated at the same time. The choice of design of the elements in the system allows for precise control of the illumination pattern and the particular telecentric cone angle patterns exiting the illumination pattern. While the preferred embodiment uses a laser source, the system is capable of utilizing a wide variety of light source devices, including all arc lamps and LED sources.

The operation of a system in accordance with one embodiment of the invention is as follows. A block diagram of the system is shown in FIG. 4. A beam of light is first generated by the laser light source (11). The light beam is expanded or sized (12) to illuminate a controlled angle diffuser (13). The expanded beam remains collimated.

The expanded beam is passed through a controlled angle diffuser (13) (e.g., hologram, bulk scatterer, etc.) to diffract or direct the light in a predetermined pattern. (Crossed lenticular arrays, or lenslet arrays can also be used as shown in FIGS. 5A, 5B, and 5C.) The controlled angle diffuser can be designed to emit light angularly in any geometry (such as rectangular to match a display device aspect ratio). The angular emission of a holographic diffuser is similar to the aperture geometry of the lens array system described above. It should be noted, however, that in the prior art it takes two optical elements with an intervening space to produce an effect which is performed by a single optical element (the holographic diffuser) in the present system.

A first field lens (14) is positioned following the holographic diffuser. This first field lens focuses and spatially overlays the diffracted light onto a single rectangular plane which lies at a distance from the lens equivalent to its focal length. A second field lens (15) is used at this illumination plane to correct for the degree of telecentricity desired in the system. In some cases, over-correction or under-correction may be desired. This image is then used as the illumination source for a display. Both field lenses function identically to field lenses in lens array systems, but at significantly lower cost.

The present systems and methods may provide a number of advantages over prior art. For instance, the level of light efficiency may be substantially increased over the prior art. Further, the problems often encountered in coherent optical systems relating to speckle and image "worminess" (high frequency intensity variation) may be reduced or eliminated. Another advantage is that the illumination provided in this manner is uniform and can be spatially formatted to match the display device being illuminated (rather than providing illumination with the Gaussian intensity falloff which is common in prior art designs).

An alternative to the holographic diffuser is a crossed lenticular array as shown in FIG. 5A. The crossed lenticular array performs the same optical function as the hologram for a rectangular emission profile, but at a lower spatial sampling rate. The lens profiles in the lenticular can be aspheric to compensate for uniformity issues as described above. The crossed lenticulars can be combined into one element as shown in FIG. 5B. An additional configuration is to integrate the crossed lenticular function into a single element lenslet array as shown in FIG. 5C. While the lenslet arrays reduce the beam sampling rate and thereby slightly reduce the resulting image uniformity, they are significantly more achromatic than some holographic diffusers and can therefore be used with polychromatic light sources. This embodiment also provides a significant advantage-over the prior art in that it does not require the intervening space and volume between the prior art lenslet arrays and thereby allows for construction of more compact systems.

The embodiments of the invention include a system and method for reducing or eliminating speckle in an image to be used as a source of illumination in a display device or system by moving a holographic diffuser, which is used to form the illumination image. The movement of the holographic diffuser causes high temporal frequency shifts in the coherent interference of the illuminating wave front, which causes the speckle pattern to shift spatially at a high rate and effectively to be blurred out without affecting the illumination image formed as a result of passing the light through the diffuser.

In one embodiment as shown in FIG. 4, a beam from a laser light source is expanded from an initial width to a second, greater width. The expanded beam is then directed onto a holographic diffuser as shown in FIG. 8C. The holographic diffuser diffracts the collimated light, forming an image which is dependent upon the particular prescription of the holographic diffuser that is used. Each differential illuminated area on the diffuser produces the same expanding angular pattern of light. As a result, the diffuser surface has a near infinite plurality of identical patterns being emitted therefrom. In the preferred embodiment, the angular pattern is an expanding rectangle of prescribed divergence whose orthogonal angles are in the ratio of the desired illumination pattern for a display device format. In this embodiment, the desired illumination pattern is a uniformly intense rectangle. A field lens is positioned following the holographic diffuser to focus and spatially overlay each of these plurality of rectangular images into a single image on a plane which lies at a distance from the lens equivalent to its focal length. A second lens is used at this plane to correct for the degree of telecentricity desired in the system. In some cases, over-correction may be desired. This image is then used as the illumination source for the display.

In one embodiment, the holographic diffuser is coupled to a means for mechanically moving it, such as a piezoelectric device as shown in FIG. 11B. The piezoelectric device moves the diffuser rapidly from side to side as shown in FIG. 11D. The movement of the holographic diffuser effectively causes movement of the speckling as described above without corresponding movement of the image. The integration of the speckling over time reduces the effect so that it does not degrade the image. The image, which is then more uniform, can be used as the illumination source for a display.

In another embodiment, the holographic diffuser can be moved in a manner other than from side to side. For example, it can be moved circularly as shown in FIG. 11E (while maintaining the same orientation) or it can be rotated (if the desired image is rotationally symmetric.) In either case, the speckling pattern will be moved in a corresponding fashion and will be blurred so that it has less affect on the image.

In another embodiment, as shown in FIGS. 12A-12G, which provides for the switching of one format, such as 4:3 of the illumination pattern to another, such as 16:9 or other combinations. The image can be changed in the system in one embodiment by switching out a first diffuser and substituting a second diffuser for it, where each diffuser produces a different characteristic image. A beam from a laser light source is expanded from an initial beam diameter to a second, greater diameter. The expanded beam is then directed onto a holographic controlled angle diffuser. The holographic diffuser diffracts the collimated light, forming an illumination image which is dependent upon the particular holographic diffuser prescription that is used. Each differential illuminated area on the diffuser produces an expanding angular pattern of light resulting in a near infinite plurality of identical patterns being emitted from the diffuser surface. In the preferred embodiment, this pattern is an expanding rectangle of prescribed divergence whose orthogonal angles are in the ratio of the desired illumination image for a particular display device format. In this embodiment, the desired illumination image is a uniformly intense rectangle. A field lens is positioned following the holographic diffuser to focus and spatially overlay each of the plurality of rectangular images onto a single rectangular illumination image which lies at a distance from the lens equivalent to its focal length. A second lens is used at the plane of the illumination image to correct for the degree of telecentricity desired in the system. In some cases, over-correction may be desired. This image is then used as the illumination source for the display. The diffuser is coupled to a switching mechanism which is configured to alternately substitute a plurality of different diffusers of different prescriptions into the optical path and thereby allow the resulting image format to be selectively controlled in order to accommodate various content formats as described above. If the switching mechanism is rotational, the diffraction pattern must be circularly symmetric.

In an alternative to the preceding embodiment, a beam from a laser light source is expanded from an initial beam diameter to a second, greater diameter. The expanded beam is then directed onto a holographic controlled angle diffuser. This holographic diffuser is electrically alterable using a device such as those supplied by Digilens, Inc. to at least two different diffraction prescriptions. The holographic diffuser diffracts the collimated light, forming an image which is dependent upon the particular holographic diffuser prescription that is activated. Each differential illuminated area on the diffuser produces an expanding angular pattern of light resulting in a near infinite plurality of identical patterns being emitted from the diffuser surface. In the preferred embodiment, this pattern is an expanding rectangle of prescribed divergence whose orthogonal angles are in the ratio of the desired illumination image for a particular display device format. In this embodiment, the desired illumination image is a uniformly intense rectangle. A field lens is positioned following the electrically alterable holographic diffuser to direct and spatially overlay each of these plurality of rectangular images onto a single rectangular plane which lies at a distance from the lens equivalent to its focal length. A second lens is used at this plane to correct for the degree of telecentricity desired in the system. In some cases, over-correction may be desired. Electrically switching the electrically alterable hologram produces different diffraction patterns on demand and thereby produces the desired format switching on demand. This illumination pattern is then used as the illumination source for the display. This system has the advantage of no moving parts as required in the prior solution, however there may be significant differences in the cost of the two approaches.

In another embodiment as shown in FIGS. 13A-13G, the diffuser may be prescribed in such a way as to allow for combination of a plurality of laser light or LED sources of different wavelengths to provide for multi-color or full color displays. A plurality of laser light sources (red, green and blue) are positioned so that the beam generated by each of the lasers is parallel to the other beams. Multiple beams of each color may be used to increase power. Each of the parallel beams is expanded from an initial beam diameter to a second, greater diameter. The expanded beams are then directed onto a segmented holographic diffuser. The holographic diffuser diffracts the collimated light from each of the laser beams according to the hologram prescription of the corresponding segment. Each differential illuminated area on the diffuser produces the same expanding angular pattern of light. As a result, the diffuser surface has a near infinite plurality of identical patterns being emitted therefrom. In the preferred embodiment, this pattern is an expanding rectangle of prescribed divergence whose orthogonal angles are in the ratio of the desired illumination pattern for the display device format. The different segments are configured to form an identical image from the respective incident beam. Each segment is slightly different to account for the wavelength dependence of the resulting diffraction pattern. In the case of a substantially achromatic diffuser, the segments can be identical in prescription simplifying the assembly. There may be cost differences in the two approaches. A field lens is positioned following the holographic diffuser to focus and spatially overlay each of these plurality of rectangular patterns into a single image on a plane which lies at a distance from the lens equivalent to its focal length. A second lens is used at this plane to correct for the degree of telecentricity desired in the system. In some cases, over-correction may be desired. This pattern is that of the desired illumination source, which in this embodiment, is a uniformly intense rectangle. This pattern is then used as the illumination source for the display.

In another embodiment, as shown in FIGS. 14A-14F, three laser light or LED sources which generate red, green and blue light are employed and impinge on a common single diffuser. In this case the holographic diffuser must be achromatic with respect to its diffractive behavior in order to use a common diffuser. A first one of the laser light sources generates a beam of which defines an optical axis. Each of the other beans is combined with the first beam using a dichroic filter. Each of these filters is configured to reflect a corresponding color of light and to allow other colors to pass through it. Thus, each of the second and third beams is added to the first beam by placing a corresponding reflective filter in the optical path of the first beam so that the reflections of the second and third beams are coaxial with the first beam. A single beam comprising what is effectively white light is thereby formed. This beam is then passed through an optical processing system (including an achromatic diffuser) to form a white-light pattern as described above which can be used as a source of illumination in a display device.

In another embodiment, the light beams produced by the different lasers are not combined in a single, coaxial beam. Instead, the different beams may be parallel, but not coaxial. Since the diffraction of the light is not dependent upon the portion of the diffuser upon which it is incident, the same diffraction pattern results from light which is incident on any portion of the diffuser. Consequently, when the light is focused, it forms the same image, regardless of the position of the input beam.

Numerous additional embodiments are also possible.

BRIEF DESCRIPTION OF THE DRAWINGS

Other objects and advantages of the invention may become apparent upon reading the following detailed description and upon reference to the accompanying drawings.

FIG. 1 is a diagram illustrating ellipitical and parabolic arc lamps in the prior art.

FIG. 2 is a diagram illustrating an elliptical arc lamp and light tunnel homogenizer in the prior art.

FIG. 3 is a diagram illustrating a lenslet array in the prior art.

FIG. 4 is a functional block diagram of an illumination system in accordance with one embodiment of the invention.

FIG. 5A is a diagram illustrating a lenticular array.

FIG. 5B is a diagram illustrating a compound crossed lenticular.

FIG. 5C is a diagram illustrating an integrated crossed lenticular.

FIG. 11A is a block diagram of a reduced speckle illumination format system.

FIG. 11B is a diagram illustrating the design of a reduced speckle format system.

FIG. 11C is a diagram of a diffraction pattern from a point on the hologram.

FIG. 11D is a diagram showing one movement axis of the hologram.

FIG. 11E is a diagram showing a circular movement of the hologram.

FIG. 11F is a flow diagram illustrating the operation of an illumination system in accordance with one embodiment of the invention.

FIG. 12A is a block diagram of a switchable format illumination system.

FIG. 12B is a diagram illustrating the design of a switchable format system with the hologram or diffuser in a first position.

FIG. 12C is a diagram illustrating the design of a switchable format system with the hologram or diffuser in a second position.

FIG. 12D is a diagram of a first diffraction pattern from a point on the hologram.

FIG. 12E is a diagram of a second diffraction pattern from a point on the hologram.

FIG. 12F is a diagram of a two prescription hologram on a translational carriage relative to the incoming beam and diffraction in a first position.

FIG. 12G is a diagram of a multi prescription hologram on a rotational carriage relative to the incoming beam and diffraction pattern in a first position.

FIG. 12H is a flow diagram illustrating the operation of an illumination system in accordance with the embodiment of the invention.

FIG. 13A is a block diagram of a system which combines multiple wavelength sources using a segmented diffuser.

FIG. 13B is a diagram illustrating the design of a multiple wavelength system using a segmented diffuser.

FIG. 13C is a diagram of a the performance of a hologram functioning with a single wavelength input.

FIG. 13D is a diagram of the problem of the pattern variance of the hologram with wavelength.

FIG. 13E is a diagram plan view of a segmented hologram with three sections each prescribed to produce the same output pattern for each of three wavelengths.

FIG. 13F is a diagram plan view of a segmented hologram with six sections comprised of three pairs of same prescriptions.

FIG. 13G is a flow diagram illustrating the operation of an illumination system in accordance with the embodiment of the invention.

FIG. 14A is a functional block diagram of one embodiment of the present system.

FIG. 14B is a diagram of the physical layout of one embodiment of the present system.

FIG. 14C is an alternative embodiment of the present system.

FIG. 14D is another alternative embodiment of the present system.

FIG. 14E is a diagram illustrating the diffraction of light at a single point on a holographic diffuser.

FIG. 14F is a diagram illustrating the diffraction of light from a holographic diffuser to generate a rectangular image.

Figure 6:
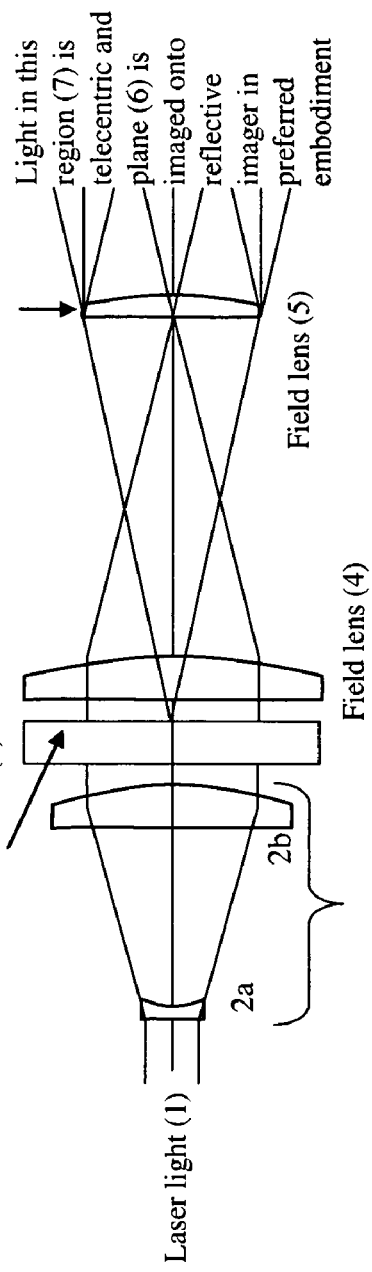
FIG. 6 is a diagram illustrating the components of an illumination system in accordance with one embodiment of the invention.

While the invention is subject to various modifications and alternative forms, specific embodiments thereof are shown by way of example in the drawings and the accompanying detailed description. It should be understood that the drawings and detailed description are not intended to limit the invention to the particular embodiments which are described. This disclosure is instead intended to cover all modifications, equivalents and alternatives falling within the scope of the present invention as defined by the appended claims.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

In broad terms, the present invention comprises systems and methods for processing light beams in an optical system that uses a controlled angle diffuser to produce an illumination pattern of predetermined shape and intensity.

Referring to FIG. 6, one embodiment of the invention is shown. This embodiment comprises a laser light source 1, a beam expansion and collimating section 2a-b, a holographic diffuser 3, a first field lens 4, and a second field lens 5. In this embodiment, all elements are coaxially centered. The function of the optical processing by the component elements is to convert the incoming substantially collimated round Gaussian laser beam to a uniform rectangular illumination plane 6 for use in illuminating a spatial light modulator such as a liquid crystal display panel (or any other type of imager). The spatial light modulator can either be illuminated immediately following the field lens 5 or the illumination plane 6 can be optically relayed with or without magnification to another position in the system.

Figure 7:
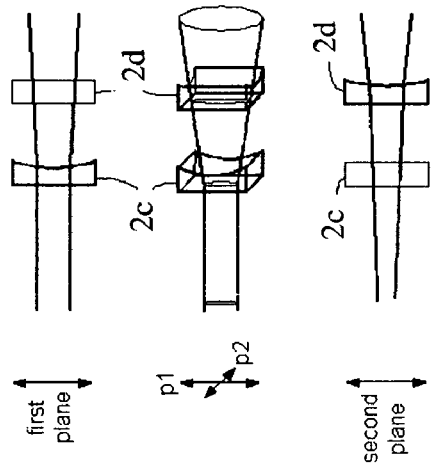
FIG. 7 is a set of diagrams illustrating an optical system designed to expand a light beam from a diode edge emitter laser beam optics by varying degrees in orthogonal planes.

The laser light source in one embodiment may comprise an edge emitting laser. Typically, such a laser emits light in a pattern which has different orthogonal divergences. That is, the emitted beam diverges more in a first plane than in a second plane. The beam must therefore be corrected by an optical system (e.g., beam expander) which has a different prescription in the first plane than in the second. This may be achieved in one embodiment using a pair of crossed cylindrical lenses of different powers as the diverging lens of the beam expander. The configuration of the pair of cylindrical lenses in this embodiment is shown in FIG. 7. Referring to FIG. 7, it can be seen that the first cylindrical diverging lens 2c causes the beam to diverge in a first plane, but not a second. The second cylindrical diverging lens 2d, on the other hand, causes the beam to diverge in the second plane, but not the first. After the beam has passed through both of the cylindrical diverging lenses, the divergence is equal in both planes and can be collimated by a converging lens. The beam exiting the beam expander is therefore collimated in both planes.

It should be noted that the cylindrical lenses described above may be replaced in another embodiment by a single astigmatic lens which performs the same function (refracting the beam by different amounts along different axes.) Likewise, the correction of the different divergences need not be corrected by the diverging lens(es). It might instead be corrected by a pair of cylindrical converging lenses, or by other elements in the optical system. In another embodiment, the divergence of the beam from the laser light source might already have greater divergence than desired in one plane so that one of the cylindrical lenses might be a converging lens while the other is a diverging lens. Many such variations are possible.

Light Emitting Diodes may also be used as light sources in other embodiments. If an LED is used, an optical system which converts the LED output profile to a substantially collimated beam is positioned following the LED. Optical systems to accomplish this are well known in the art.

The preferred embodiment would use a high power VECSEL (Vertical Cavity Surface Emitting Laser) such as those manufactured by Novalux, Inc and termed NECSEL (Novalux Extended Cavity Surface Emitting Laser) due to its substantially cylindrical beam shape and high power capability.

The ability to modify the system to operate with a wide range of sources and source intensity profiles is one of the advantages that may be provided by the present system.

Laser light 1 is shown entering the system of FIG. 6 from the left. The light is monochromatic and collimated with a typical cylindrical beam diameter of 0.3-3 mm, although other diameters and geometries are feasible. Polychromatic sources such as tunable lasers or pre-combined monochromatic sources may also be used. While the intensity profile of the beam in the preferred embodiment is Gaussian, other intensity profiles and laser multi mode profiles will work as well.

Once a substantially collimated light beam is established a beam expander can be used to expand the beam diameter. The amount by which the beam is expanded is determined by the desired F number (as will be described below). The beam expander may be omitted if the collimated source is of sufficient diameter.

A beam expander (2) expands the light beam and re-collimates the light. In a first embodiment, the beam expander is comprised of two elements and an intervening beam expansion space. In this embodiment a first plano-concave lens 2a is used to create a conical beam divergence symmetrically centered along the optical axis. A second plano-convex lens 2b is used to halt the beam expansion and re-collimate the laser beam into a second larger diameter beam having its divergence minimized so that its rays are substantially parallel to the optical axis. This larger diameter beam is then directed onto a holographic diffuser (3).

Figure 8A:
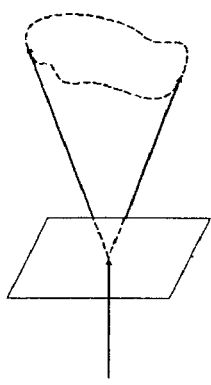
FIG. 8A is a diagram illustrating the profile of a cone of light emerging from a holographic diffuser in one embodiment of the invention.
Figure 8C:
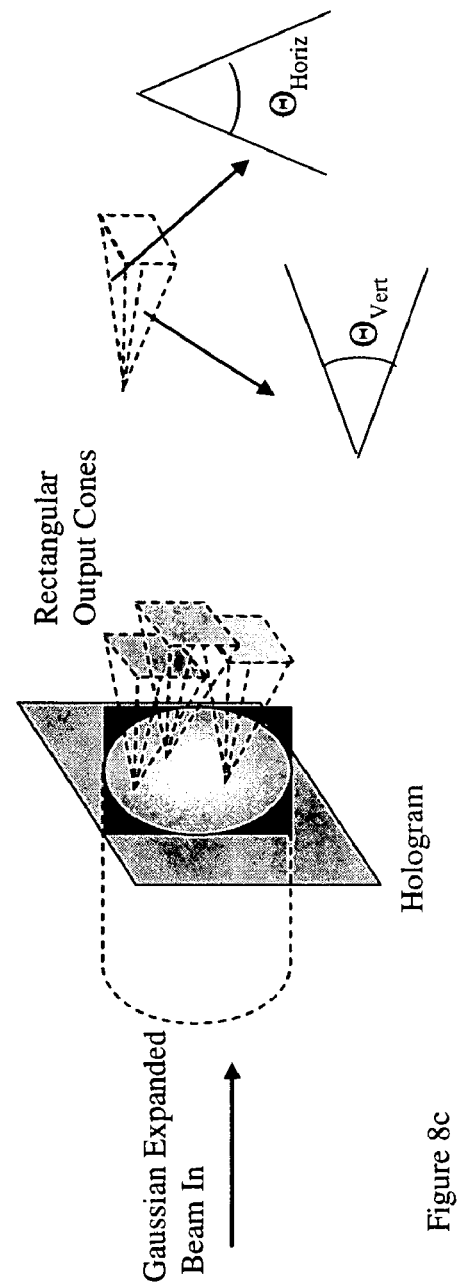
FIG. 8C is a diagram illustrating the profiles of several cones of light emerging from a holographic diffuser in one embodiment.
Figure 9:
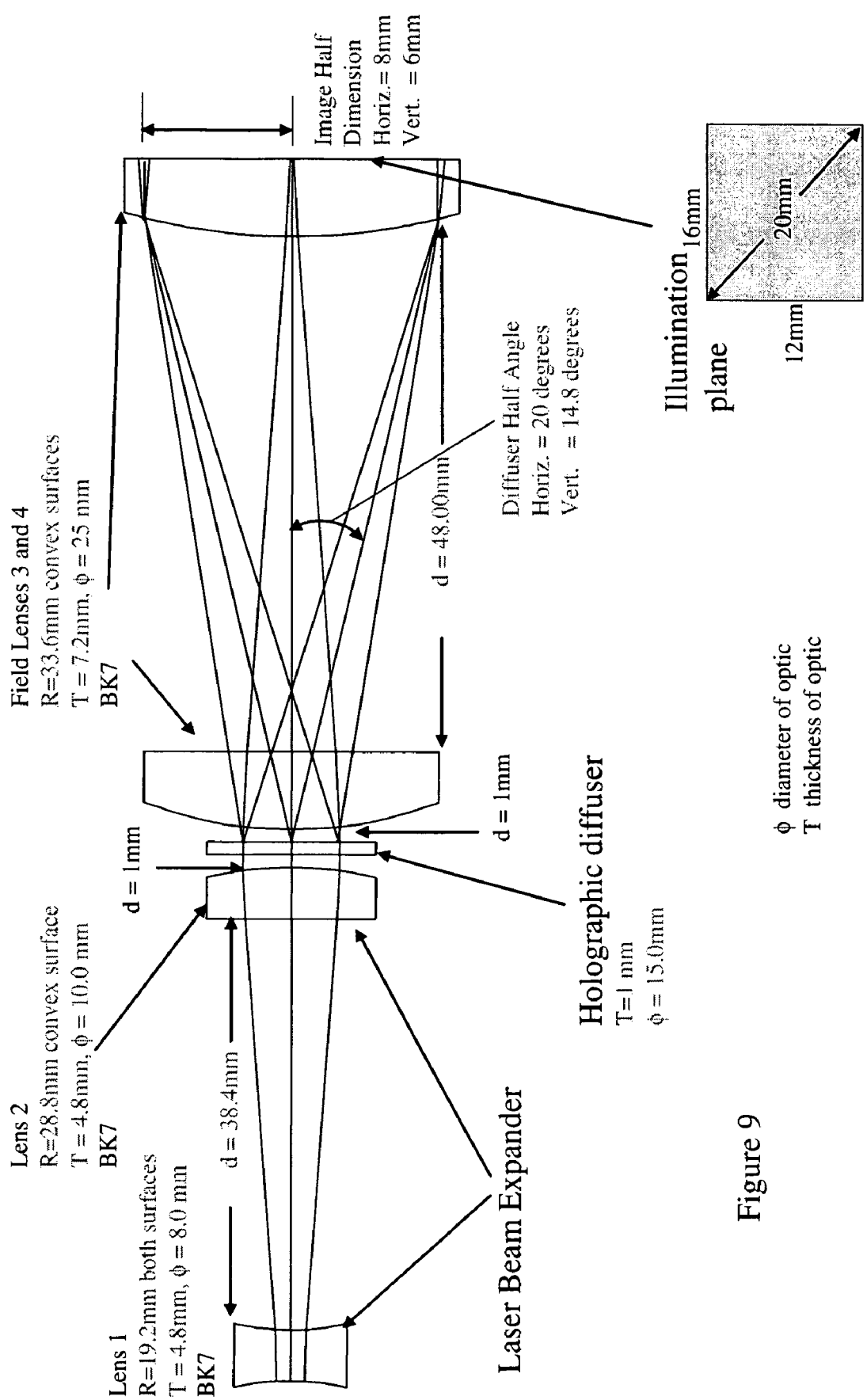
FIG. 9 is a diagram illustrating the specific design of an illumination system in a preferred embodiment.
Figure 10:
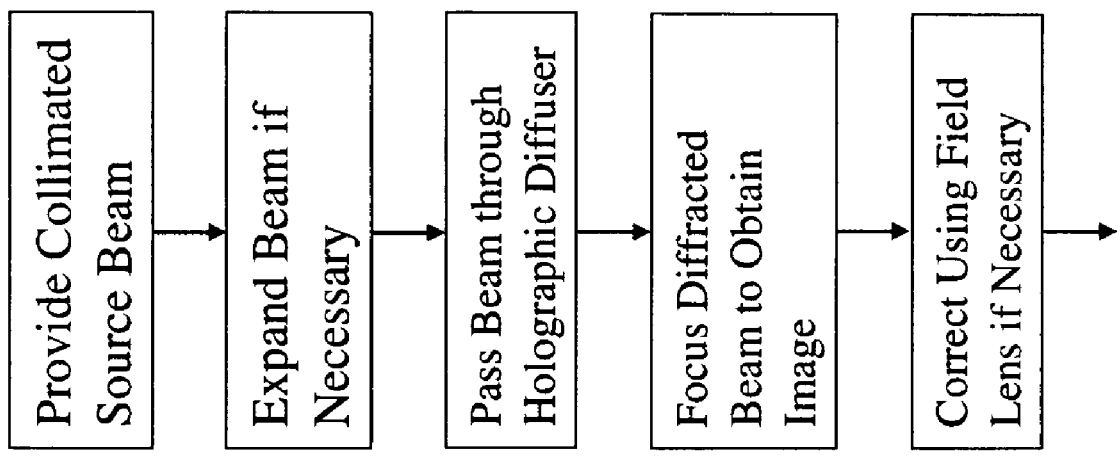
FIG. 10 is a flow diagram illustrating the operation of an illumination system in accordance with one embodiment of the invention.

A holographic diffuser (3) follows the beam expander. In the preferred embodiment this diffuser has the properties of converting an incident laser beam to a plurality of rectangular light cone profiles as shown in FIG. 8C according to the hologram prescription. That is, the light exiting each differential point on the diffuser forms a rectangular cone of light. The rectangular cone of light has its horizontal and vertical orthogonal angles in the ratio of the format of the desired illumination pattern for a display device. In the preferred embodiment, the desired illumination pattern at the output is a uniformly intense rectangle of 4:3 aspect ratio to correspond to standard NTSC television format and standard XGA computer monitor format. In the specific design example shown in FIG. 9, the corresponding angles are thetaHoriz=20 degrees and thetaVert=14.8 degrees. The specific horizontal and vertical angles for the 4:3 aspect ratio system or any other format are calculated as follows:

$$\theta_{Horiz} = \text{Arctan}(0.5 \times W_{Image}/D_{diff\text{-}image})$$

$$\theta_{Vert} = \text{Arctan}(0.5 \times H_{Image}/D_{diff\text{-}image})$$

Where: $\theta_{Horiz}$=diffuser horizontal half angle divergence
$\theta_{Vert}$=diffuser vertical half angle divergence
$W_{Image}$=Half width of the desired Illumination plane 6
$H_{Image}$=half height of the desired Illumination plane 6
$D_{diff\text{-}image}$=Distance from diffuser to Illumination plane 6

Other hologram prescriptions would be used for wide format HDTV, etc. Each of these light cones is generated from energy from a small section, or sample, of the laser beam Gaussian power profile resulting in a much higher level of uniformity in each light cone than in the original beam. In the preferred embodiment, the center ray of these cone patterns is substantially parallel to the optical axis. Each ray within a given expanding cone has a corresponding parallel ray in all of the other cones being emitted from the surface. All of these parallel rays are at the same angle relative to the central axis. Each set of parallel rays will map to a unique point on the Illumination Plane 6, as a result of the field lens 4 described below. Therefore, the angular pattern of ray divergence defines the shape of the Illumination image at plane 6. Since each point in the Illumination image will be composed of energy from all points in the incoming Gaussian beam, the uniformity of the illumination Plane is substantially improved over the uniformity of the original Gaussian beam. The effect is similar to the prior art lenslet array systems whereby each rectangular cone of light is created by sampling the incoming beam at all points and then overlaying the samples on each other at the illumination plane. The Lenslet arrays sample a much lower spatial frequency and therefore produce a less uniform result.

Figure 8B:
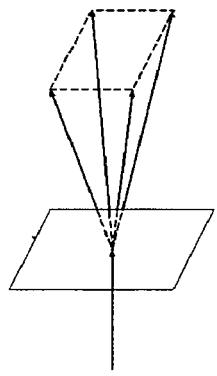
FIG. 8B is a diagram illustrating the profile of a cone of light emerging from a holographic diffuser in an alternative embodiment.

Other light cone profiles (e.g., circular) are also feasible as shown in FIG. 8B. In fact, the profile may be arbitrarily defined for the application.

The final uniformity is then dependent primarily on the angular power profile of the diffraction pattern of the holographic diffuser. In the preferred embodiment, this profile is that of substantially linear power per degree of solid angle to effect a near uniform power and intensity in the Illumination image. Nonlinear hologram power profiles versus angle of divergence of the light cones can be designed into the hologram to compensate for geometric uniformity problems in the illumination pattern such as the cosine$^4$ power rolloff or other system non-uniformities.

Referring to FIG. 8A, a diagram illustrating the diffraction of light at a single point on a holographic diffuser is shown. As the collimated light passes through the holographic diffuser, it is diffracted so that it exits in a certain cone of light. ("Cone" refers to the solid angle into which the light is radiated.) The cone may be irregularly shaped, as indicated by the dashed line at the right side of the figure if other illumination plane formats are desired. This dashed line is the outline of the diffraction pattern image. The diffraction pattern image is characteristic of the holographic diffuser, and the light emanating from each point on the holographic diffuser radiates outward in a cone of the same shape (i.e., the shape of the image.)

The holographic diffuser can be configured to create any desired diffraction pattern (and corresponding image.) Referring to FIG. 8B, a holographic diffuser configured to generate a rectangular image from each incident point is illustrated. It is contemplated that a holographic diffuser which is configured to generate this type of image will be useful in applications such as projection-type displays, where a rectangular light source is desired. More particularly, the holographic diffusers which are used in display devices can be configured to produce an image which is uniformly intense across its entire area, thereby resulting in a higher-quality image on the display.

It should be noted that the dashed image outlines illustrated in FIGS. 8A and 8B are not themselves images. They are instead representative of the cross-section of the cone into which light radiates from a particular point on the holographic diffuser. Thus, light radiating from a different point on the holographic diffuser will radiate into an identical cone which is displaced laterally from the illustrated cone. While the cones originating at each point on the holographic diffuser are displaced from each other, the image which is produced by passing this light through a field lens and thereby focusing it does not move with the addition of light emanating from new points on the holographic diffuser. Instead, this additional light increases the intensity of the image which has already been formed. The additional light may, however alter the angular extent of the image formed by the lens.

FIG. 8C shows some of the plurality of rectangular patterns generated across the hologram from the area illuminated by the laser beam.

The profile of the illumination footprint on the diffuser controls the angular extent of the light cones exiting the Illumination Plane (6) and thus the numerical aperture or F number of the system. Parallel rays from the diffuser pattern all map to a unique point on the Illumination Plane. The exit angle of that ray from the Illumination Plane 6 is determined by the radial offset of that ray from the image point. The collection of rays which pass through the image point thereby set the light cone shape and divergence corresponding to that point.

Therefore, the diffuser (3) solid cone angle shape (i.e., the diffraction pattern) exiting the diffuser defines the spatial extent of the Illumination pattern and the light illumination footprint entering the diffuser (3) defines the pattern of the light cones and therefore the F number at the Illumination Plane (6.)

Various treatments and configurations of the diffuser in the preferred embodiment solve numerous system problems as identified above. These problems occur as a result of choosing various light sources and by the design variances used for different applications.

One problem which may arise from the use of highly coherent or narrow bandwidth monochromatic light sources is an effect called "laser speckle" which is visible in the illumination pattern. In order to reduce speckling in the image, the holographic diffuser is continually moved. The effectively "smears" the speckling over the image. The diffuser may be moved in a number of ways such as a reciprocating motion or a circular motion. Because the light exiting the diffuser at any point is the same, the movement will not affect the image as long as the axis orientation of the diffuser remains the same.

Referring to FIGS. 11A-11F, a diagram illustrating the diffraction of light at a single point on a holographic diffuser is shown. As the collimated light passes through the holographic diffuser, it is diffracted so that it exits in a certain cone of light. ("Cone" is used here to refer to an angular area into which the light is radiated.) The cone may be irregularly shaped.

The holographic diffuser can be configured to create any desired diffraction pattern (and corresponding image), as indicated by the dashed line at the right side of the figure. This dashed line is the outline of the diffraction pattern image. Referring to FIG. 11C, a holographic diffuser configured to generate a rectangular image is illustrated. The diffraction pattern image is characteristic of the holographic diffuser, and the light emanating from each point on the holographic diffuser radiates outward in a cone of the same shape (i.e., the shape of the image.)

It is characteristic of laser light that images produced with this light are speckled, as indicated by the shading on FIG. 11C. This is a result of the fact that the laser light is coherent and monochromatic. The net effect is often a high frequency mottling of the image formed by the laser light, sometimes called "speckled." This effect can be reduced if the holographic diffuser is continually moved. The movement of the diffuser effectively smears or blurs the speckling. (The absence of shading in FIGS. 11D and 11E indicates the elimination or reduction of the speckling.) The diffuser need not move in a particular direction (e.g., in a reciprocating or circular motion), but the axis orientation of the diffuser should remain the same despite the motion unless the pattern is circularly symmetric. In other words, the diffuser should be displaced by the motion, but the motion should not change the optical axis orientation in which the diffuser faces. Additionally the plane of the diffuser cannot be tilted as that effectively changes the ray angles exiting the diffuser relative to the rest of the system.

As indicated in FIG. 11B, the holographic diffuser is coupled to a piezoelectric device in one embodiment. The piezoelectric device is configured to move the diffuser in response to an electrical signal. When the signal is high, the piezoelectric device moves the diffuser toward a first position, and when the signal is low, the device moves the diffuser toward a second position. Thus, a signal which alternates between high and low values (e.g., a square wave) causes the piezoelectric device to move the diffuser back and forth. See FIG. 11D. The amount and speed of the displacement are dependent upon the particular embodiment in which in the device is used, but should be chosen so that the movement of the holographic diffuser is sufficient to reduce the speckling effect. In other embodiments, other types of motion may be employed (see, e.g., FIG. 11E,) and corresponding means for imparting this motion to the diffuser will be necessary.

Referring to FIGS. 3-5, it is contemplated that a holographic diffuser which is configured to generate a uniformly intense, rectangular image will be useful in applications such as projection-type displays, where a rectangular light source is desired. More particularly, the holographic diffusers which are used in display devices can be configured to produce an image which is uniformly intense across its entire area, thereby resulting in a higher-quality image on the display. The quality of the image (and more specifically, the uniformity of the image) is improved by reducing the effect of laser speckle.

It should be noted that the dashed image outline illustrated in FIGS. 11C-11E is not itself an image. It is instead representative of the cross-section of the cone into which light radiates from a particular point on the holographic diffuser. Thus, light radiating from a different point on the holographic diffuser will radiate into an identical cone which is displaced laterally from the illustrated cone. While the cones originating at each point on the holographic diffuser are displaced from each other in the image which is produced by passing this light through a field lens and thereby focusing it does not move with the addition of light emanating from new points on the holographic diffuser. Instead, this additional light increases the intensity of the image which has already been formed. However, the angular extent of the light in this plane is a function of the spatial extent of the light leaving the diffuser.

The operation of the optical system described above is therefore generally as illustrated in FIG. 11F. Referring to this figure, a laser light beam is provided for input to the system. The beam is expanded and then passed through a holographic diffuser. The diffuser is moved to reduce the speckling of the image formed by the laser light. The light which emanates from the holographic diffuser is then focused to obtain the desired image on a plane at a finite distance from the focusing (field) lens.

One problem, as described above, which may arise from the application is one wherein the display device is required to produce more than one video format at various times. For instance, television program content can be formatted in standard definition with a 4:3 aspect ratio where high definition images are formatted in 16:9 aspect ratios. Others such as "letterbox" and many others exist and are dynamically changed with program material as required. In all cases the preferred embodiment can accommodate the particular format, but each format as described above is produced by a particular diffuser design and is fixed.

In this case, a multiplicity of diffuser elements with a variety of prescriptions, each designed to produce the various formats at each primary color wavelength may be ganged together on a mechanical carriage or wheel and translated into the optical axis position from a control system and a motor or solenoid device.

Referring to FIG. 12A, a functional block diagram of one embodiment of the present system is shown. The laser beam is generated by laser 311. The beam is typically 0.3 -3.0 millimeters in diameter and has a Gaussian profile with respect to its energy density. Other geometries and profiles are possible. A multiplicity of beams may be combined to increase the power in the resulting illumination image. In this case, the beams are typically in close proximity to each other. The distance between the beams is dependent upon the configuration of the particular embodiment. The beams may be non-parallel as well to produce special output characteristics of size, shape and divergence, or to allow for manufacturing tolerances.

The laser light beam is passed through one or more beam expanders 312. The beam expander increases the diameter of the beam, but does not significantly alter the substantially parallel directions of the beams or the collimation of the light.

The expanded beam is then passed through one of a multiplicity of holographic diffusers 313 each of a different pattern prescription in order to produce a different shaped illumination pattern on demand. The holographic diffuser diffracts the collimated light from each of the laser beams according to the hologram prescription. Each differential illuminated area on the diffuser produces an expanding angular pattern of light resulting in a near infinite plurality of identical interference patterns being emitted from the diffuser surface. In the preferred embodiment, this diffuser pattern is an expanding rectangle of prescribed divergence whose orthogonal angles are in the ratio of the desired illumination image for a display device format. In this embodiment, the desired illumination image at the output is a uniformly intense rectangle. In some embodiments, other types of controlled angle diffusers, diffractors, or refractors as noted above may be used.

Holographic diffuser 313 is mechanically connected to switching device 325 and on command from electrical or mechanical means physically moves one hologram out of the optical path and another one into the path thereby changing the hologram or diffuser prescription and so the illumination pattern produced at the output of the system.

The light emerging from holographic diffuser 313 is passed through a field lens 314, which has a certain focal length. This field lens performs an angle to area transformation on the diffused light and thereby causes all rays emanating from the hologram which are parallel relative to each other to map to a point at a distance from the lens equal to its focal length. Therefore, a diffuser which produces a rectangle in angle space (an expanding rectangle) will produce a rectangular spatial pattern one focal distance from the field lens. This can be seen in the ray traces on FIG. 12B between elements 313 and 324. The intensity of this pattern is uniform since each point of the pattern is composed of power from all regions of the incoming beams. Therefore, as incoming laser beam area or power is increased, the brightness of the rectangular pattern increases with no change in its shape or size. However, the angular extent of the light in this plane is a function of the spatial extent of the light leaving the diffuser. Thus, the illustrated system generates an illumination pattern, which has a shape, intensity and angular distribution determined by holographic diffuser 313 at a plane 323 determined by field lens 314.

Referring to FIG. 12B, the physical layout of one embodiment of the present system is shown. In this figure, the single laser which generates the light beam is not shown. The beam is illustrated entering the optical system from the left side of the figure. In this embodiment, the system is configured to use a beam expander to increase the diameter of the laser light beam. The beam expander consists of a first, diverging lens 321 and a second, converging lens 322. The expanded beam is then passed through a holographic diffuser 313 and a field lens 314. The image generated by holographic diffuser 313 and field lens 314 lies on plane 323. Holographic diffuser 313 is switchable by switching device 325. Switching device 325 is a device which mechanically effects the substitution of a first hologram for a second of a different prescription. This could be accomplished by any of a number of mechanical means easily designed by a person of ordinary skill in the art of mechanical design. It can be seen from the figure that, while the illumination image at plane 323 may be uniform, the rays emanating from each point radiate outward in cones which do not all have their respective axis parallel to the axis of the optical system. A second field lens 324 is therefore located at plane 323 to correct the rays exiting the plane (i.e., to cause all of the cones of emanating light to be aligned with a desired optical axis.)

Referring to FIG. 12C, a second illustration of the physical layout of the system is shown. In this figure, switching device 325 is not shown. Instead, the figure depicts the movement of the diffusers. In this instance, diffuser 313a is shown being switched out of the optical path, and diffuser 313b is shown being inserted in its place.

Referring to FIG. 12D, a diagram illustrating the diffraction of light at a single point on a holographic diffuser is shown. As the collimated light passes through the holographic diffuser, it is diffracted so that it exits in a certain cone of light. ("Cone" is used here to refer to an angular area into which the light is radiated.) The cone may be irregularly shaped. The dashed line is the outline of the diffraction pattern image. The diffraction pattern image is characteristic of the holographic diffuser, and the light emanating from each point on the holographic diffuser radiates outward in a cone of the same shape (i.e., the shape of the image.)

The holographic diffuser can be configured to create any desired diffraction pattern (and corresponding image), as indicated by the dashed line at the right side of the figure. This dashed line is the outline of the diffraction pattern image. Referring to FIG. 12D, a holographic diffuser 313a configured to generate a rectangular pattern of a first shape is illustrated. The diffraction pattern image is characteristic of the holographic diffuser, and the light emanating from each point on the holographic diffuser radiates outward in an angular cone of the same shape (i.e., the shape of the image.)

Because the particular cone of light emitted from each point on a diffuser (and the resultant image) is characteristic of that particular diffuser prescription, changing the illumination image is a matter of replacing the current diffuser with a different one. Referring to FIG. 12E, a diagram illustrating the diffraction of light at a single point on a second holographic diffuser 313b is shown which generates a rectangular pattern of a second shape. Light which is incident at a point on this diffuser forms an emitted cone of light which is different from that of diffuser 313a. As can be seen in the figure, its height-to-width ratio is greater than that of the first diffuser.

As indicated in FIG. 12B and 12C, the holographic diffusers are coupled to a switching mechanism. The switching mechanism is configured to move the diffusers alternately in and out of the optical path. The switching mechanism may comprise any suitable means for moving the diffusers. In one embodiment, the diffusers may be secured in a simple frame which the user can slide back and forth to switch diffusers. This is illustrated in FIG. 12F. The diffuser mechanism is shown in a second position in which diffuser 313b is in the optical path. If the mechanism is moved to the right into a first position, diffuser 313a will be switched into the optical path. The diffuser mechanism can be moved manually by a user, or it may be motorized so that the movement of the mechanism can be activated by an appropriate electrical signal.

FIG. 12G shows an alternate embodiment of a diffuser switching mechanism. In this embodiment, the different diffusers are arranged in a circular structure that can be rotated to place the desired diffuser in the optical path. A ray is shown passing through the segment of the structure comprising diffuser 313b (this ray is depicted by a series of solid lines.) If the structure is rotated, the segments comprising diffusers 313a, 313b, or 313c may be switched (manually or in an automated fashion) into the optical path. Each of these diffusers produces a different characteristic image. (A ray passing through diffuser 313a is depicted by the dotted lines—this is shown merely to illustrate the differences between the characteristic images and is not intended to show that light passes through both diffusers at the same time.

In addition to mechanical means of switching hologram prescriptions by physical substitution of a first prescription for a second prescription to change the illumination pattern or characteristics, an alternative electro-optical means may be used for elements 313 in FIGS. 12A and 12B to switch the hologram prescription by non-mechanical means. A typical device for this can be fabricated by and available from Digilens, Inc. The device is composed of a liquid crystal diffraction element capable of changing from a first optical function prescription to a second optical prescription by application of an electrical signal to the device. In this case the prescriptions can be specified and a device tailored to produce the required diffuser prescriptions can be produced. They would then be activated and controlled by switching device 325 in FIGS. 12A and 12B.

Another problem as described above is that Laser and LED sources are monochromatic and must be combined to produce full color or multi color illumination patterns in order to render full color or multi color images. Since most Holographic diffusers are produced with a prescription which only functions properly at a single wavelength, a specific diffuser prescription must be used for each primary color. One method of combining sources of various wavelengths is shown in FIGS. 13A-13G. Additionally, a multiplicity of lasers of each wavelength may be used as shown to increase the available optical power output of the system.

While the descriptions of the embodiment which follows refer to the use of a holographic diffuser, it should be noted that this diffuser may comprise various types of controlled angle diffusers as indicated above.

Referring to FIG. 13A, a functional block diagram of one embodiment of the present system is shown. The laser beams which are to be combined are generated by one or more lasers 411. The beams are generally parallel, but are not coaxial. Typically, the beams are 0.3-3 millimeters in diameter and have Gaussian profiles with respect to their energy densities. Other geometries and profiles are possible, however. The beams are typically in close proximity to each other. The distance between the beams is dependent upon the configuration of the particular embodiment.

The laser light beams are passed through one or more beam expanders 412. The beam expanders increase the respective diameters of the beams, but do not alter the directions of the beams or the collimation of the light.

The expanded beams are then passed through a holographic diffuser 413. Holographic diffuser 413 causes the light incident at each point to radiate outward into a predetermined angular area and thereby causes a diffraction pattern to be generated by the light from the expanded laser beams. The holographic diffuser diffracts the collimated light from each of the laser beams according to the hologram prescription at the point of incidence. Each differential illuminated area on the diffuser produces an expanding angular pattern of light resulting in a near infinite plurality of identical interference patterns being emitted from the diffuser surface. The hologram prescription of diffuser 413 varies, depending upon which part of the diffuser the light strikes. More specifically, diffuser 413 comprises a plurality of segments, each of which is configured to diffract light of a particular wavelength into a specific pattern. Diffuser 413 is configured so that the resulting pattern for each segment is identical when the corresponding wavelength light is diffracted. In the preferred embodiment, this diffuser pattern is an expanding rectangle of prescribed divergence whose orthogonal angles are in the ratio of the desired illumination pattern for a display device format. In this embodiment, the desired illumination pattern at the output is a uniformly intense rectangle. Consequently, each of the light beams contributes to the diffraction pattern without changing the pattern itself. In some embodiments, other types of controlled angle diffusers may be used.

The light emerging from holographic diffuser 413 is passed through a field lens 414, which has a certain focal length. This field lens performs an angle to area transformation on the diffused light and thereby causes all rays emanating from the hologram which are parallel relative to each other to map to a point at a distance from the lens equal to its focal length. Therefore, a diffuser which produces a rectangle in angle space (an expanding rectangle) will produce a rectangular spatial pattern one focal distance from the field lens. This can be seen in the ray traces on FIG. 13B between elements 413 and 424. The intensity of this pattern is uniform since each point of the pattern is composed of power from all regions of the incoming beams. Therefore, as incoming laser beam area or power is increased, the brightness of the rectangular pattern increases with no change in its shape or size. However, the angular extent of the light in this plane is a function of the spatial extent of the light leaving the diffuser. Thus, the illustrated system generates an image which has a shape, intensity, and angular divergence determined by holographic diffuser 413 at a plane determined by field lens 414 and field lens 424.

Referring to FIG. 13B, the physical layout of one embodiment of the present system is shown. In this figure, the lasers which generate the light beams are not shown. It should also be noted that only two beams are shown in this figure for clarity. While the system may be used to combine two, or any other number of beams, the description of the system herein is directed primarily to embodiments in which red, green and blue beams (or multiples thereof) are combined to form a full color image.

The beams are illustrated entering the optical system from the left side of the figure. Each of the beams passes through a beam expander. Each of the beam expanders consists of a first, diverging lens 421 and a second, converging lens 422. (It should be noted that, for the purposes of this disclosure, identical items in the figures may be indicated by identical reference numerals followed by a lowercase letter, e.g., 422a, 422b, and so on—the items may be collectively referred to herein simply by the reference numeral.) The expanded beams are then passed through a segmented holographic diffuser 413 and a single field lens 414, which direct the respective beams at plane 423.

The footprint of the beams on holographic diffuser 413 in one embodiment is shown in FIG. 13E. In this embodiment, three beams are input to the system. (The footprint of an embodiment in which six beams are combined is shown in FIG. 13F.) It can be seen in this figure that each of the beams is incident on a separate segment of diffuser 413. The segments are indicated by the reference numerals 415a, 415b and 415c. Each of these segments is configured to operate with a particular wavelength of light and each is configured to generate essentially the same diffraction pattern for its respective wavelength. (It should be noted that, because the field lens likely has a slightly different focal length for each of these wavelengths, the diffuser segments may be configured to emit the different wavelengths into slightly different angular areas to compensate for the aberration.) After the different light beams pass through their respective segments of diffuser 413, they are directed by field lens 414 into the identical image (albeit in different colors.)

The image generated by holographic diffuser 413 and field lens 414 lies on plane 423. It can be seen from the figure that, while the image at plane 423 may be uniform in intensity, the light cones emanating from each point (in the absence of an optical element at that point) radiate outward in a spherical pattern which is not parallel to the axis of the optical system. A second field lens 424 is therefore located at plane 423 to correct the light cones exiting the plane (i.e., to cause all of the cones of emanating light to be aligned, or telecentric with the optical axis.) Some Applications may require overcorrection of the telecentricity.

Referring to FIG. 13C, a diagram illustrating the diffraction of light at a single point on a segmented holographic diffuser is shown. As the collimated light passes through the holographic diffuser, it is diffracted so that it exits in a certain cone of light. ("Cone" is used here to refer to an angular area into which the light is radiated.) The cone may have an arbitrary shape, although it is shown here being rectangular. The diffraction pattern image is characteristic of the segment of the holographic diffuser through which the light passes. Monochromatic light emanating from each point within a segment of the holographic diffuser radiates outward in a cone of the same shape (i.e., the shape of the image.)

FIG. 13C shows an upper segment 415a and a lower segment 415b. Two rays are shown hitting diffuser 413—one striking segment 415a and one striking segment 15b. It is assumed that the ray hitting segment 415a has a wavelength corresponding to this segment of the diffuser. Likewise, the ray hitting segment 415b has a wavelength corresponding to that segment. As a result of the matching of the appropriate rays and diffuser segments, light emanates outward from each point into essentially identical solid angles, each being displaced by the spacing of the beams. Because the light rays radiate into the same solid angles, the directing of these rays will form overlapping images. If the diffuser were not segmented, the light from the each of the rays would radiate outward into different solid angles as shown in FIG. 13D. In this instance, the resulting image would not be as uniformly illuminated.

The operation of the optical system described above is generally as illustrated in FIG. 13G. Referring to this figure, parallel laser light beams are provided for input to the system. These beams are expanded and are then passed through a segmented holographic diffuser. The light which emanates from the holographic diffuser is then focused to obtain the desired image on a plane at a finite distance from the focusing (field) lens. If desired, a second field lens can be used to correct the angle at which light propagates forward from the image.

It should be noted that in the case of an achromatic diffuser, that is one whose prescription is independent of wavelength over the range of input wavelengths, different segment prescriptions are not necessary and a multiplicity of sources of different wavelengths can be combined with the same architecture.

Additionally, in the case of the achromatic diffuser, different wavelength sources can be combined as shown in FIGS. 14A-14F.

Referring to FIG. 14A, a functional block diagram of one embodiment of the present system is shown. The laser beams which are to be combined are generated by one or more lasers 511. The beams may initially be in a variety of configurations. The beams are combined by beam combiner 510, after which they are parallel and possibly coaxial. ("Combined" as used here is not intended to imply that the beams are necessarily overlapped, but simply that they are parallel and positioned for input to the optical processing system.) Typically, the beams are 0.3-3 millimeters in diameter and have Gaussian profiles with respect to their energy densities. Other geometries and profiles are possible, however. The combined beams are typically in close proximity to each other. The distance between the beams is dependent upon the configuration of the particular embodiment.

The laser light beams are passed through one or more beam expanders 512. The beam expanders increase the respective diameters of the beams, but do not alter the parallel directions of the beams or the collimation of the light.

The expanded beams are then passed through an achromatic holographic diffuser 513. The achromatic holographic diffuser 513 diffracts the collimated light from each of the laser beams according to the hologram prescription. Each differential illuminated area on the diffuser produces an expanding angular pattern of light resulting in a near infinite plurality of identical interference patterns being emitted from the diffuser surface. In the preferred embodiment, this diffuser pattern is an expanding rectangle of prescribed divergence whose orthogonal angles are in the ratio of the desired illumination pattern for a display device format. In this embodiment, the desired illumination pattern at the output is a uniformly intense rectangle. Because the holographic diffuser is achromatic, the diffraction pattern is the same for any color of light. In some embodiments, types of controlled angle diffusers other than holographic diffusers may be used.

The light emerging from holographic diffuser 513 is passed through a field lens 514, which has a certain focal length. This field lens performs an angle to area transformation on the diffused light. All rays emanating from the hologram which are parallel relative to each other are mapped to a point at a distance from the lens equal to the focal length of the lens. Therefore, a diffuser which produces a rectangle in angle space (an expanding rectangle) will produce a rectangular spatial pattern one focal distance from the field lens. This can be seen in the ray traces on FIG. 14B between elements 513 and 523. The intensity of this pattern is uniform since each point of the pattern is composed of power from all regions of the incoming beams. Therefore, as incoming laser beam area or power is increased, the brightness of the rectangular pattern increases with no change in its shape or size. However, the angular extent of the light in this plane is a function of the spatial extent of the light leaving the diffuser. Thus, the illustrated system generates an image, which has a shape and intensity and angular distribution determined by holographic diffuser 513 at a plane determined by field lens 514.

Referring to FIG. 14B, the physical layout of one embodiment of the present system is shown. In the system depicted this figure, three laser sources (511a-511c) are employed to generate light beams of three different colors. (It should be noted that, for the purposes of this disclosure, identical items in the figures may be indicated by identical reference numerals followed by a lowercase letter, e.g., 511a, 511b, and so on—the items may be collectively referred to herein simply by the reference numeral.) A beam generated by a first one of the laser sources 511a is aligned with the optical axis of the beam expander. This is also the axis of combiner 510, which comprises two beam splitters (dichroic filters) 526a and 526b. Each of the beam splitters lies in the optical path of the beam generated by laser sources 511a. Each of the beam splitters is also aligned with one of the other laser sources (511b and 511c.) The beam splitters are configured to reflect the light beams from the respective laser sources so that the beams will be reflected along the optical axis of the combiner 510 and beam expander 512. Beam splitters 526a and 526b are each configured to reflect light having a particular wavelength and to transmit all other wavelengths. More specifically, they are configured to reflect light having the same wavelength as the respective laser sources. Thus, the light generated by laser source 511 a passes through both beam splitters and is incident on lens 521. Similarly, the light generated by laser source 511b is reflected off of beam splitter 526a and passes through beam splitter 526b. The light generated by laser source 511c is reflected off of beam splitter 526b and into the beam expander.

In this embodiment, the beams are combined coaxially, or nearly so. Consequently, the system is configured to use a single beam expander for the combined laser light beams. The beam expander consists of a first, diverging lens 521 and a second, converging lens 522. The expanded beams are then passed through achromatic holographic diffuser 513 and a single field lens 514. The image generated by holographic diffuser 513 and field lens 514 lies on plane 523. It can be seen from the figure that, while the image at plane 523 may be uniform, the light cones emanating from each point (in the absence of an optical element at that point) radiate outward in a spherical pattern which is not parallel to the axis of the optical system. A second field lens 524 is therefore located at plane 523 to correct the ray angles exiting the plane (i.e., to cause all of the cones of emanating light to be aligned with the optical axis, or telecentric.) Some Applications may require overcorrection of the telecentricity.

Referring to FIG. 14C, a second embodiment of the present system is shown. In this embodiment, the laser light sources are arranged so that the second and third beams (from sources 511b and 511c) are combined from opposite sides of the optical axis. Functionally, this arrangement does not differ from the embodiment of FIG. 14B. This configuration may, however, provide for a more compact package if the laser sources are large enough that they cannot be conveniently located next to each other.

Referring to FIG. 14D, a third embodiment of the present system is shown. In this embodiment, the laser light sources are arranged so that the three beams are combined by a dichroic "X" cube, an optical element known to the projection and optics industry. Functionally, this does not differ from the embodiment of FIG. 14B. This configuration provides for a more compact design of the combiner as the beam splitters occupy the half the space when they are crossed.

Referring to FIG. 14E, a diagram illustrating the diffraction of light at a single point on a holographic diffuser is shown. As the collimated light passes through the holographic diffuser, it is diffracted so that it exits in a certain cone of light. ("Cone" is used here to refer to an angular area into which the light is radiated.) The cone may be irregularly shaped, as indicated by the dashed line at the right side of the figure. This dashed line is the outline of the diffraction pattern image. The diffraction pattern image is characteristic of the holographic diffuser, and the light emanating from each point on the holographic diffuser radiates outward in a cone of the same shape (i.e., the shape of the image.)

The holographic diffuser can be configured to create any desired diffraction pattern (and corresponding image.) Referring to FIG. 14F, a holographic diffuser configured to generate a rectangular image is illustrated. It is contemplated that a holographic diffuser which is configured to generate this type of image will be useful in applications such as projection-type displays, where a rectangular light source is desired. More particularly, the holographic diffusers which are used in display devices can be configured to produce an image which is uniformly intense across its entire area, thereby resulting in a higher-quality image on the display.

It should be noted that the dashed pattern outlines illustrated in FIGS. 14E and 14F are not themselves images. They are instead representative of the cross-section of the cone into which light radiates from a particular point on the holographic diffuser. Thus, light radiating from a different point on the holographic diffuser will radiate into an identical cone which is displaced laterally from the illustrated cone. While the cones originating at each point on the holographic diffuser are displaced from each other, the image which is produced by passing this light through a field lens and thereby focusing it does not move with the addition of light emanating from new points on the holographic diffuser.

Because the image formed at plane 523 remains the same whether the light passes through a first point on the holographic diffuser or a second point, parallel laser light beams which pass through the holographic diffuser will each add to the intensity of the same image, whether they are coaxial or not. Consequently, beams which are side-by side are combined in the same image at plane 523.

The operation of the optical system described above is therefore generally as illustrated in FIG. 14G. Referring to this figure, parallel laser light beams are provided for input to the system. These beams are expanded and are then passed through a holographic diffuser. The light which emanates from the holographic diffuser is then directed to obtain the desired image on a plane at a finite distance from the field lens.

The optical system described above may be used for a number of purposes. One of these purposes is the illumination of an imager in a projection display device. It is desirable in such devices to have a source of illumination which is uniform and which has a shape corresponding to the shape of the imager used in the device. In this instance, a holographic diffuser which forms such an image can be selected. The optical system can then be configured to focus this image either on a plane which is coincident with the imager of the display device, or on a plane from which it can be transmitted, via relay optics, to the imager.

Figure 15B:
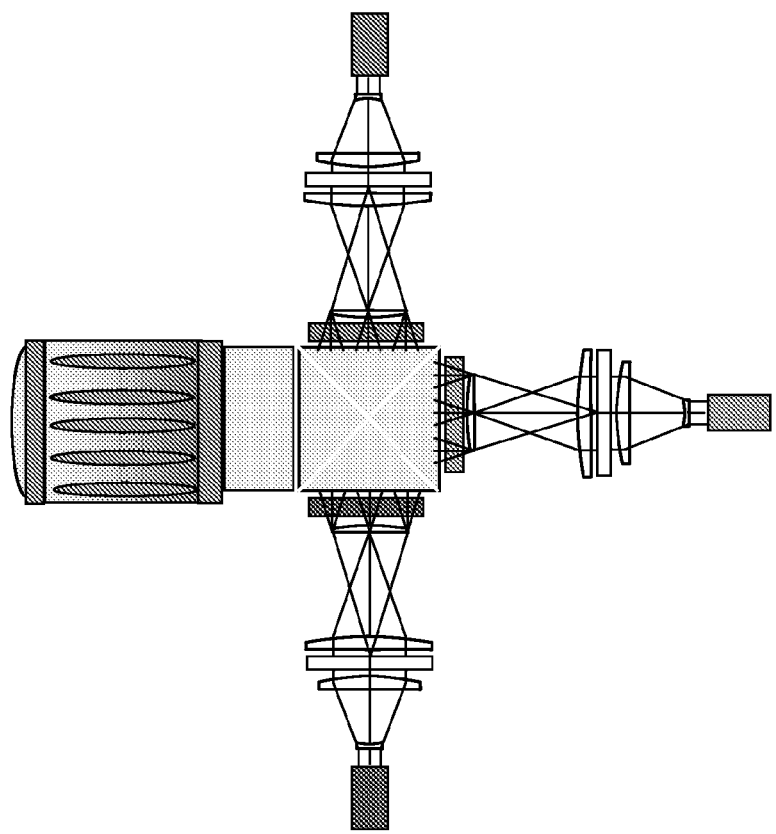
FIG. 15B is a diagram illustrating an embodiment of the present system including a transmissive imager.
Figure 16B:
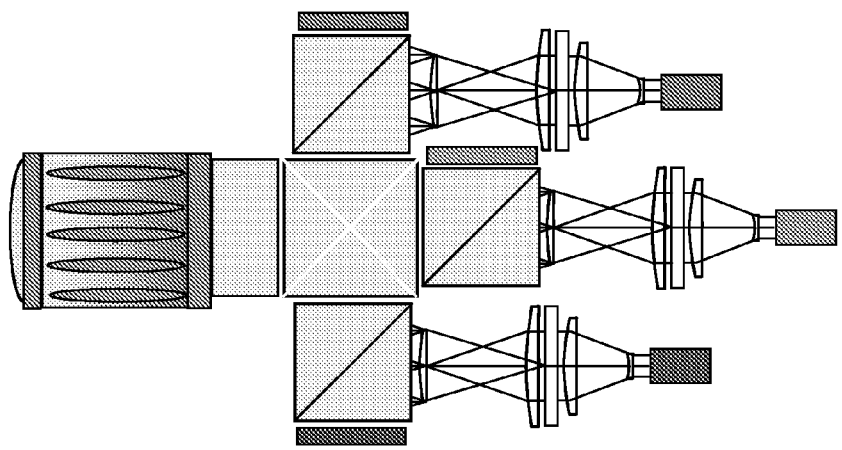
FIG. 16B is a diagram illustrating a Polarizing Beam Splitter/Imager system in accordance with one embodiment of the invention.
Figure 17B:
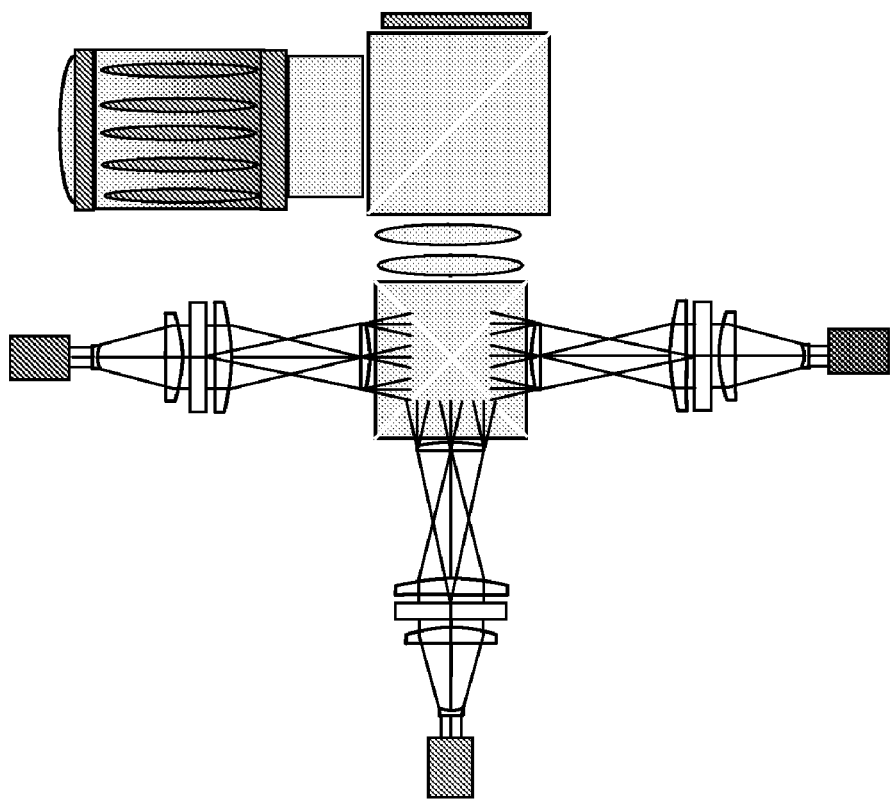
FIG. 17B is a diagram illustrating a color sequential imaging system in accordance with one embodiment of the invention.

Several projection systems utilizing this embodiment are shown in FIGS. 15B, 16B and 17B. These architectures are well known in the art and should be exemplary of how embodiments of the invention can be used in such systems.

Figure 15A:
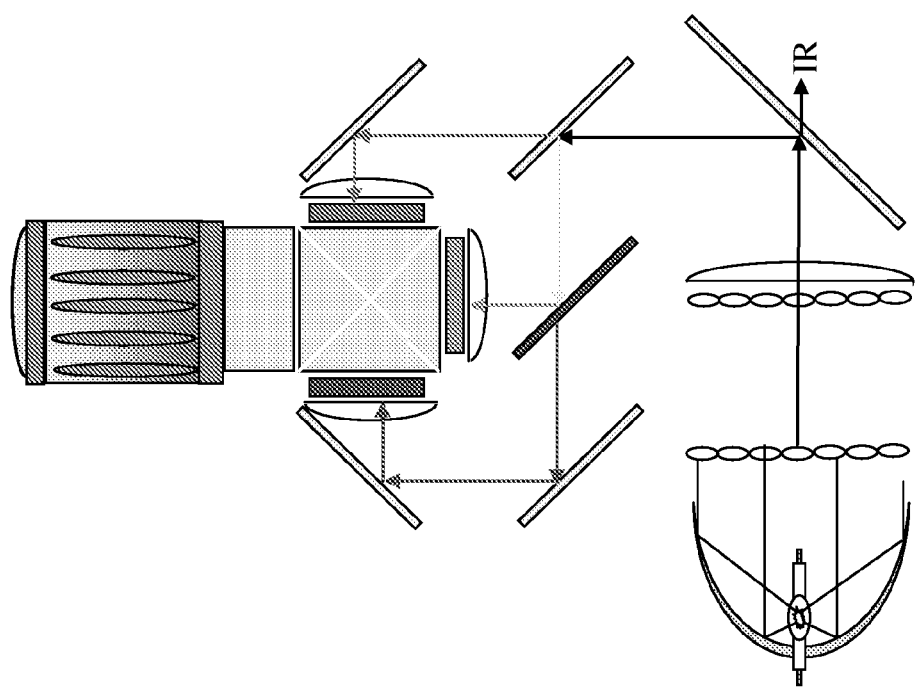
FIG. 15A is a diagram illustrating a prior art transmissive imager system.

FIG. 15A shows a typical prior art system using an arc lamp using three separate transmissive imagers for each primary red, green and blue color. In this case optical filters are used to separate the white light from the source into its constituent primary colors.

Figure 16A:
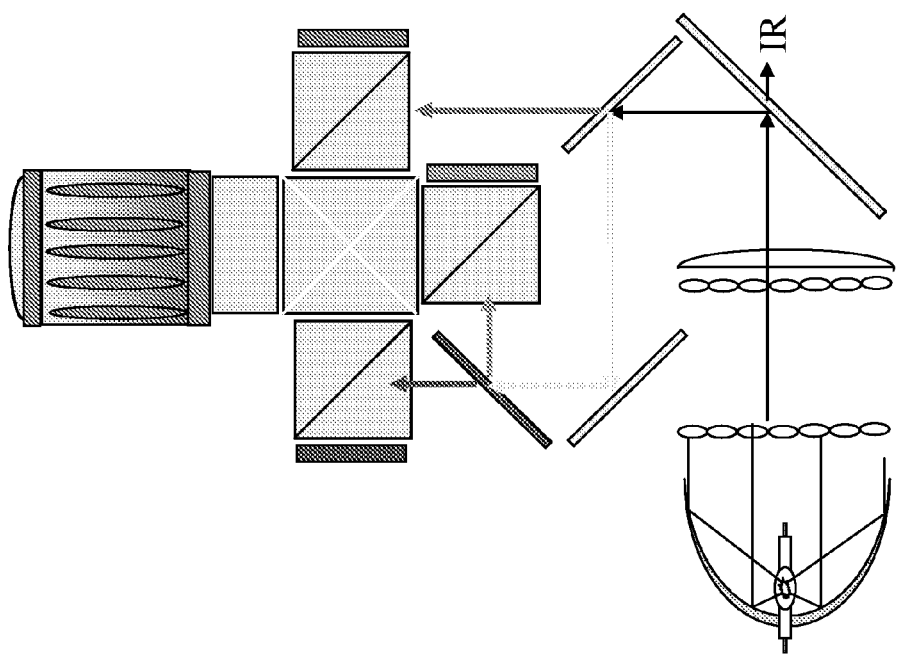
FIG. 16A is a diagram illustrating a Polarizing Beam Splitter/Imager system in the prior art.

FIG. 15B shows the same three imager transmissive system which uses three separate imagers for each primary red, green and blue color with three separate monochromatic illumination sources which each comprise embodiments of the invention. In each of the separate illumination sources, the hologram prescription is designed to operate at a specific monochromatic wavelength so as to produce the same size illumination image to fit the spatial light modulator (the imager) each of which are the same size and shape. In the case of three imager systems, all sources are on continuously FIG. 16A shows a typical prior art three polarizing beam splitter system using an arc lamp using three separate imagers for each primary red, green and blue color and three transmissive imagers system for each corresponding primary. In this case optical filters are used to separate the white light from the source into its constituent primary colors.

FIG. 16B shows a three imager, three beamsplitter reflective imager system using three independent sources comprising an embodiment of the invention as described above.

Figure 17A:
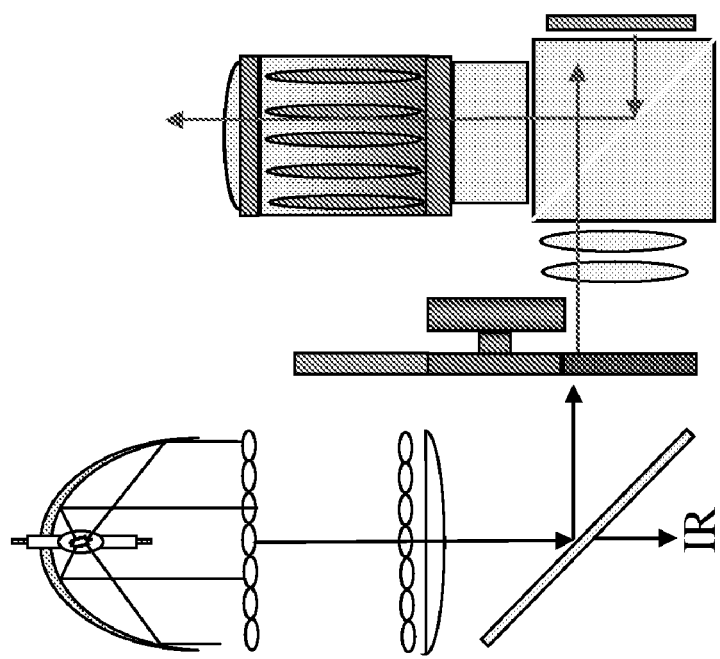
FIG. 17A is a diagram illustrating a Prior art one color sequential imaging system.

FIG. 17A shows a typical prior art one imager color sequential system using an arc lamp source and a color filter wheel for temporal color sequencing. The sources are temporally modulated in sequence with the color information active on the spatial light modulator (the imager.)

FIG. 17B shows a one-imager color sequential system also using three independent sources comprising an embodiment of the invention pre-combined by a color combiner to produce a coaxial polychromatic illumination source. The sources are temporally modulated in sequence with the color information active on the spatial light modulator (the imager.)

Another purpose for which the present system can be used is the combination of laser light beams for input to an optical fiber. Laser light sources are currently used in fiber optic communication systems to provide optical signals which are input to the fibers. Often, however, these laser light sources do not provide sufficient power to transmit signals over the desired distances. Using the present system, a plurality of laser light beams can be combined for input to a single fiber. In this instance, a diffuser which images the light beams as a single spot smaller than the diameter of the fiber can be selected. The spot can be imaged onto the end of the fiber, thereby transmitting the light into the fiber. In this embodiment, the aperture of the diffuser and/or corresponding field lens can be selected to ensure that the light which is imaged onto the optical fiber is within the numerical aperture necessary to transmit the light into the fiber.

The benefits and advantages which may be provided by embodiments of the present invention have been described above with regard to specific embodiments. These benefits and advantages, and any elements or limitations that may cause them to occur or to become more pronounced are not to be construed as a critical, required, or essential features of any or all of the claims. As used herein, the terms "comprises," "comprising," or any other variations thereof, are intended to be interpreted as non-exclusively including the elements or limitations which follow those terms. Accordingly, a process, method, article, or apparatus that comprises a list of elements does not include only those elements but may include other elements not expressly listed or inherent to the claimed process, method, article, or apparatus.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A system comprising:
    a light source configured to emit highly collimated light rays;
    a controlled angle diffuser
        wherein the controlled angle diffuser is configured to receive the highly collimated light rays and to transform each of the light rays into a corresponding light cone having a profile determined by the controlled angle diffuser
        wherein the controlled angle diffuser has one or more modifiable characteristics including a prescription of a portion of the controlled angle diffuser which transforms the rays of light,
        wherein the controlled angle diffuser has two or more regions having different prescriptions, wherein the position of the controlled angle diffuser is modifiable to alternately position different ones of the two or more regions in an optical path of the system; and
    a field lens configured to focus the light cones into a first illumination pattern.

2. The system of claim 1, wherein the controlled angle diffuser is segmented into the two or more regions, wherein the position of the controlled angle diffuser is rotatable to alternately position different ones of the two or more regions in an optical path of the system.

3. A system comprising:
    a light source configured to emit highly collimated light rays;
    a controlled angle diffuser
        wherein the controlled angle diffuser is configured to receive the highly collimated light rays and to transform each of the light rays into a corresponding light cone having a profile determined by the controlled angle diffuser
        wherein the controlled angle diffuser has one or more modifiable characteristics, including the prescription of the controlled angle diffuser, wherein the system includes a mechanism configured to change the position of the controlled angle diffuser and to thereby change the prescription of a portion of the controlled angle diffuser that receives the light rays; and a field lens configured to focus the light cones into a first illumination pattern.

4. A method comprising;

providing highly collimated rays of light;

transforming each of the rays of light into a light cone using a controlled angle diffuser that has one or more modifiable characteristics, wherein the light cone has a profile determined by the controlled angle diffuser; and focusing the light cones into a illumination pattern; and modifying the one or more modifiable characteristics of the controlled angle diffuser to modify the illumination pattern, wherein modifying the one or more modifiable characteristics of the controlled angle diffuser comprises modifying a prescription of a portion of the controlled angle diffuser which transforms the rays of light by providing two or more regions in the controlled angle diffuser having different prescriptions, and modifying the position of the controlled angle diffuser to alternately position different ones of the two or more regions to receive the rays of light.

5. The method of claim 4, wherein modifying the position of the controlled angle diffuser comprises rotating the controlled angle diffuser.

* * * * *